(12) United States Patent
Nishida et al.

(10) Patent No.: US 9,507,953 B2
(45) Date of Patent: Nov. 29, 2016

(54) INFORMATION PROCESSING SYSTEM, INFORMATION PROCESSING METHOD, AND INFORMATION PROCESSING APPARATUS

(71) Applicants: Takayori Nishida, Tokyo (JP); Munetake Moroyama, Tokyo (JP)

(72) Inventors: Takayori Nishida, Tokyo (JP); Munetake Moroyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/284,525

(22) Filed: May 22, 2014

(65) Prior Publication Data

US 2014/0366104 A1 Dec. 11, 2014

(30) Foreign Application Priority Data

Jun. 5, 2013 (JP) ................................ 2013-118522

(51) Int. Cl.
 *G06F 21/00* (2013.01)
 *G06F 21/60* (2013.01)
(52) U.S. Cl.
 CPC .................................. *G06F 21/608* (2013.01)
(58) Field of Classification Search
 USPC .......................... 726/5; 358/1.14, 1.15, 1.16
 See application file for complete search history.

(56) References Cited

U.S. PATENT DOCUMENTS

| 8,629,999 | B2 | 1/2014 | Nishida |
| 2004/0001226 | A1* | 1/2004 | Ohtuka ........................ 358/1.15 |
| 2012/0300268 | A1 | 11/2012 | Oseto et al. |
| 2013/0329245 | A1 | 12/2013 | Nishida |

FOREIGN PATENT DOCUMENTS

| JP | 2001-051915 | 2/2001 |
| JP | 2004-236348 | 8/2004 |
| JP | 2012-248006 | 12/2012 |
| JP | 2014-016979 | 1/2014 |

\* cited by examiner

*Primary Examiner* — Jason Lee
(74) *Attorney, Agent, or Firm* — IPUSA, PLLC

(57) ABSTRACT

An information processing system includes one or more information processing apparatuses that implement an output data reception unit that receives sets of output data via a network, an identification unit that identifies a user identifier to be associated with the received sets of output data by referring to user information stored in a user information storage unit, a storage processing unit that stores the sets of output data in a data storage unit in association with individual identifiers and a common identifier when the user identifier is not identified by the identification unit, a reporting unit that reports the common identifier via the network, and a transmission unit that receives the user identifier or a combination of an individual identifier and the common identifier via the network, and sends output data associated with the received user identifier or the received combination via the network.

17 Claims, 28 Drawing Sheets

FIG.6

| USER NAME | PASSWORD | EMAIL ADDRESS | ..... |
|---|---|---|---|
| A | ..... | aaa@xxxxx | ..... |
| B | ..... | bbb@xxxxx | ..... |
| : | : | : | : |

| USER NAME | USER MODE | JOB NAME | DATA IDENTIFICATION NUMBER | REQUEST IDENTIFICATION NUMBER | FILE PATH NAME | DATE AND TIME |
|---|---|---|---|---|---|---|
| | G | EMAIL BODY | 03 | 1234 | C:¥ProgramData¥1¥1 | 10:02:32 |
| | G | ATTACHED DATA 1 | 1 | 1234 | C:¥ProgramData¥1¥2 | 10:02:34 |
| | G | ATTACHED DATA 2 | 2 | 1234 | C:¥ProgramData¥1¥3 | 10:02:40 |
| | G | ATTACHED DATA 3 | 3 | 1234 | C:¥ProgramData¥1¥4 | 10:02:41 |
| | G | ATTACHED DATA 4 | 4 | 1234 | C:¥ProgramData¥1¥5 | 10:02:42 |
| | G | ATTACHED DATA 5 | 5 | 1234 | C:¥ProgramData¥1¥6 | 10:02:49 |
| | G | ATTACHED DATA 6 | 6 | 1234 | C:¥ProgramData¥1¥7 | 10:02:58 |
| Tom | U | Document.doc | | | C:¥ProgramData¥1¥8 | 10:03:02 |
| Nancy | U | SpreadSheet.xls | | | C:¥ProgramData¥1¥9 | 10:03:08 |
| | G | EMAIL BODY | 03 | 1235 | C:¥ProgramData¥1¥10 | 10:03:09 |
| | G | ATTACHED DATA 1 | 1 | 1235 | C:¥ProgramData¥1¥11 | 10:03:10 |
| | G | ATTACHED DATA 2 | 2 | 1235 | C:¥ProgramData¥1¥12 | 10:03:12 |
| Jim | U | Presentation.ppt | | | C:¥ProgramData¥1¥13 | 10:03:17 |
| | G | EMAIL BODY | 03 | 1236 | C:¥ProgramData¥1¥14 | 10:03:20 |
| | G | ATTACHED DATA 1 | 1 | 1236 | C:¥ProgramData¥1¥15 | 10:03:21 |
| | G | ATTACHED DATA 2 | 2 | 1236 | C:¥ProgramData¥1¥16 | 10:03:33 |
| | G | ATTACHED DATA 3 | 3 | 1236 | C:¥ProgramData¥1¥17 | 10:03:38 |
| | G | ATTACHED DATA 4 | 4 | 1236 | C:¥ProgramData¥1¥18 | 10:03:51 |
| | G | ATTACHED DATA 5 | 5 | 1236 | C:¥ProgramData¥1¥19 | 10:03:58 |

| DATA | DATA IDENTIFICATION NUMBER |
|---|---|
| EMAIL BODY | 03 |
| ATTACHED DATA 1 | 1 |
| ATTACHED DATA 2 | 2 |
| ATTACHED DATA 3 | 3 |
| ATTACHED DATA 4 | 4 |
| ATTACHED DATA 5 | 5 |
| ATTACHED DATA 6 | 6 |

FIG.10

| PRINT OBJECT | PIN CODE |
|---|---|
| SELECTED WHEN PRINTING | 00#1234 |
| EMAIL BODY + ALL SETS OF ATTACHED DATA | 01#1234 |
| ALL SETS OF ATTACHED DATA | 02#1234 |
| EMAIL BODY | 03#1234 |
| ATTACHED DATA 1 | 1#1234 |
| ATTACHED DATA 2 | 2#1234 |
| ATTACHED DATA 3 | 3#1234 |
| ATTACHED DATA 4 | 4#1234 |
| ATTACHED DATA 5 | 5#1234 |
| ATTACHED DATA 6 | 6#1234 |

FIG.14

| COMPANY CODE | RECEPTION ADDRESS |
|---|---|
| COMPANY 1 | office1@cloud.co.jp |
| COMPANY 2 | office2@cloud.co.jp |
| COMPANY 3 | office3@cloud.co.jp |
| : | : |

| USER NAME | USER MODE | JOB NAME | DATA IDENTIFICATION NUMBER | REQUEST IDENTIFICATION NUMBER | FILE PATH NAME | DATE AND TIME | COMPANY CODE |
|---|---|---|---|---|---|---|---|
| | G | EMAIL BODY | 03 | 1234 | C:\ProgramData\1\1 | 10:02:32 | COMPANY 1 |
| | G | ATTACHED DATA 1 | 1 | 1234 | C:\ProgramData\1\2 | 10:02:34 | COMPANY 1 |
| | G | ATTACHED DATA 2 | 2 | 1234 | C:\ProgramData\1\3 | 10:02:40 | COMPANY 1 |
| | G | ATTACHED DATA 3 | 3 | 1234 | C:\ProgramData\1\4 | 10:02:41 | COMPANY 1 |
| | G | ATTACHED DATA 4 | 4 | 1234 | C:\ProgramData\1\5 | 10:02:42 | COMPANY 1 |
| | G | ATTACHED DATA 5 | 5 | 1234 | C:\ProgramData\1\6 | 10:02:49 | COMPANY 1 |
| | G | ATTACHED DATA 6 | 6 | 1234 | C:\ProgramData\1\7 | 10:02:58 | COMPANY 1 |
| Tom | U | Document.doc | | | C:\ProgramData\1\8 | 10:03:02 | COMPANY 2 |
| Nancy | U | SpreadSheet.xls | | | C:\ProgramData\1\9 | 10:03:08 | COMPANY 2 |
| | G | EMAIL BODY | 03 | 1235 | C:\ProgramData\1\10 | 10:03:09 | ... |
| | G | ATTACHED DATA 1 | 1 | 1235 | C:\ProgramData\1\11 | 10:03:10 | ... |
| | G | ATTACHED DATA 2 | 2 | 1235 | C:\ProgramData\1\12 | 10:03:12 | ... |
| Jim | U | Presentation.ppt | | | C:\ProgramData\1\13 | 10:03:17 | ... |
| | G | EMAIL BODY | 03 | 1236 | C:\ProgramData\1\14 | 10:03:20 | ... |
| | G | ATTACHED DATA 1 | 1 | 1236 | C:\ProgramData\1\15 | 10:03:21 | ... |
| | G | ATTACHED DATA 2 | 2 | 1236 | C:\ProgramData\1\16 | 10:03:33 | ... |
| | G | ATTACHED DATA 3 | 3 | 1236 | C:\ProgramData\1\17 | 10:03:38 | ... |
| | G | ATTACHED DATA 4 | 4 | 1236 | C:\ProgramData\1\18 | 10:03:51 | ... |
| | G | ATTACHED DATA 5 | 5 | 1236 | C:\ProgramData\1\19 | 10:03:58 | ... |

| COMPANY CODE | DEVICE ID |
|---|---|
| COMPANY 1 | ... |
| COMPANY 1 | ... |
| : | : |
| COMPANY 2 | ... |
| : | : |

| ORGANIZATION CODE | USER NAME | PASSWORD | EMAIL ADDRESS | ROLE | 733 |
|---|---|---|---|---|---|
| COMPANY 1 | A | ..... | aaa@xxxxx | ADMINISTRATOR | ..... |
|  | B | ..... | bbb@xxxxx | USER | ..... |
|  | .. | .. | .. | .. | .. |
| COMPANY 2 | .. | .. | .. | .. | .. |

FIG.23

| | | 520 |

ORGANIZATION CODE

USER NAME

PASSWORD

REQUEST
IDENTIFICATION
NUMBER 521    522

OK     CANCEL    ISSUE NUMBER

| ORGANIZATION CODE | REQUEST IDENTIFICATION NUMBER |
|---|---|
| XXX | 100 |
| YYY | 101 |
| YYY | 102 |
| XXX | 103 |

FIG.29

| ORGANIZATION CODE | USER NAME | PASSWORD |
|---|---|---|
| XXX | A | ... |
| YYY | B | ... |

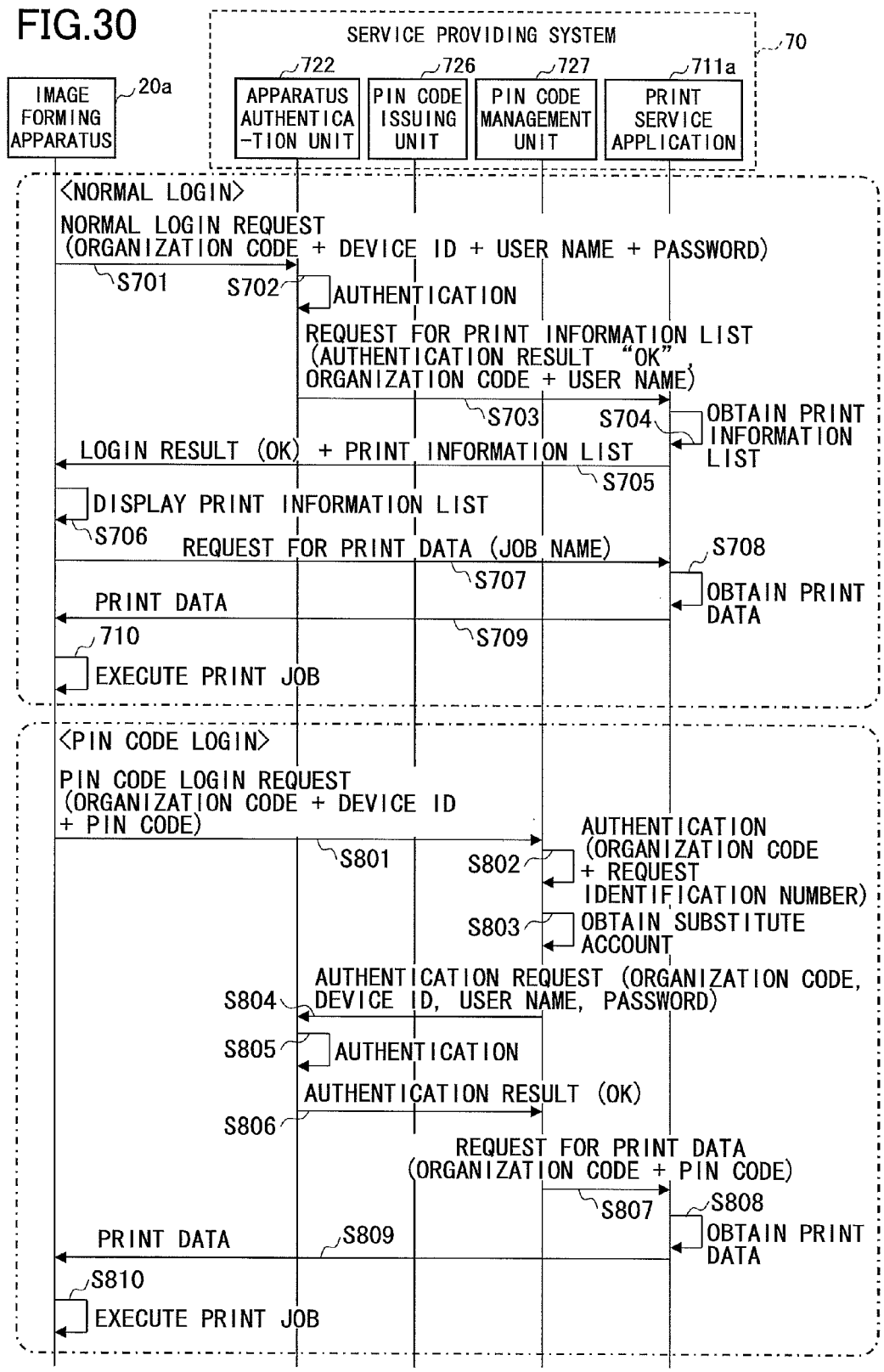

INFORMATION PROCESSING SYSTEM, INFORMATION PROCESSING METHOD, AND INFORMATION PROCESSING APPARATUS

CROSS-REFERENCE TO RELATED APPLICATION

The present application is based upon and claims the benefit of priority of Japanese Patent Application No. 2013-118522, filed on Jun. 5, 2013, the entire contents of which are incorporated herein by reference.

BACKGROUND OF THE INVENTION

1. Field of the Invention

An aspect of this disclosure relates to an information processing system, an information processing method, and an information processing apparatus.

2. Description of the Related Art

There exists a system where print data is not immediately printed in response to a print request input by a user on, for example, a personal computer (PC), but is stored in a storage of a server or an image forming apparatus in association with a user name of the user (see, for example, Japanese Laid-Open Patent Publication No. 2004-236348 and Japanese Laid-Open Patent Publication No. 2001-051915). In the system, when the user enters the user name and a password via an operations panel of an image forming apparatus, the image forming apparatus performs authentication based on the user name and the password. When the authentication is successful, the image forming apparatus displays, on the operations panel, a list of sets of print data stored in the storage in association with the user name. When a set of print data is selected from the list, the image forming apparatus obtains the selected set of print data from the storage and prints the obtained set of print data.

With a system as described above, a print is output when a user is present beside an image forming apparatus. This configuration makes it possible to prevent a print from being left unattended at the image forming apparatus or picked up by a wrong person. Accordingly, this configuration makes it possible to improve the security of printed information.

With a system as described above, however, only a user having an account for authentication can execute a print process. Therefore, for example, such a system is inconvenient for a guest who has no account and needs to ask a person with an account to print a document. To solve this problem, a common guest account may be provided for guests. With this approach, however, because a common account is used by multiple guests, a guest can access print data of another guest. Thus, this approach may compromise the security of printed information that the system is intended to provide.

As another approach, an image forming apparatus dedicated for guests may be provided. However, this approach increases costs and installation space.

SUMMARY OF THE INVENTION

In an aspect of this disclosure, there is provided an information processing system including one or more information processing apparatuses that implement an output data reception unit that receives a plurality of sets of output data via a network, an identification unit that identifies a user identifier to be associated with the received sets of output data by referring to user information stored in a user information storage unit, a storage processing unit that stores the sets of output data in a data storage unit in association with individual identifiers assigned to the respective sets of output data and a common identifier common to the sets of output data when the user identifier is not identified by the identification unit, a reporting unit that reports the common identifier via the network, and a transmission unit that receives the user identifier or a combination of at least one of the individual identifiers and the common identifier via the network, and sends at least one of the sets of output data associated with the received user identifier or the received combination of the at least one of the individual identifiers and the common identifier via the network.

BRIEF DESCRIPTION OF THE DRAWINGS

FIG. 6 is a table illustrating an exemplary configuration of a user information storage unit;

FIG. 7 is a table illustrating an exemplary configuration of a print information storage unit according to the first embodiment;

FIG. 9 is a table illustrating exemplary data identification numbers;

FIG. 10 is a table illustrating exemplary PIN codes in a response email;

FIG. 14 is a table illustrating an exemplary configuration of an address information storage unit;

FIG. 15 is a table illustrating an exemplary configuration of a print information storage unit according to the second embodiment;

FIG. 16 is a table illustrating an exemplary configuration of a user device information storage unit;

FIG. 21 is a table illustrating an exemplary configuration of a user information storage unit according to the fourth embodiment;

FIG. 23 is a drawing illustrating an exemplary login screen according to the fourth embodiment;

FIG. 29 is a table illustrating an exemplary configuration of a substitute account management table; and FIG. 30 is a sequence chart illustrating an exemplary print data output process.

DESCRIPTION OF THE PREFERRED EMBODIMENTS

Figure 1:
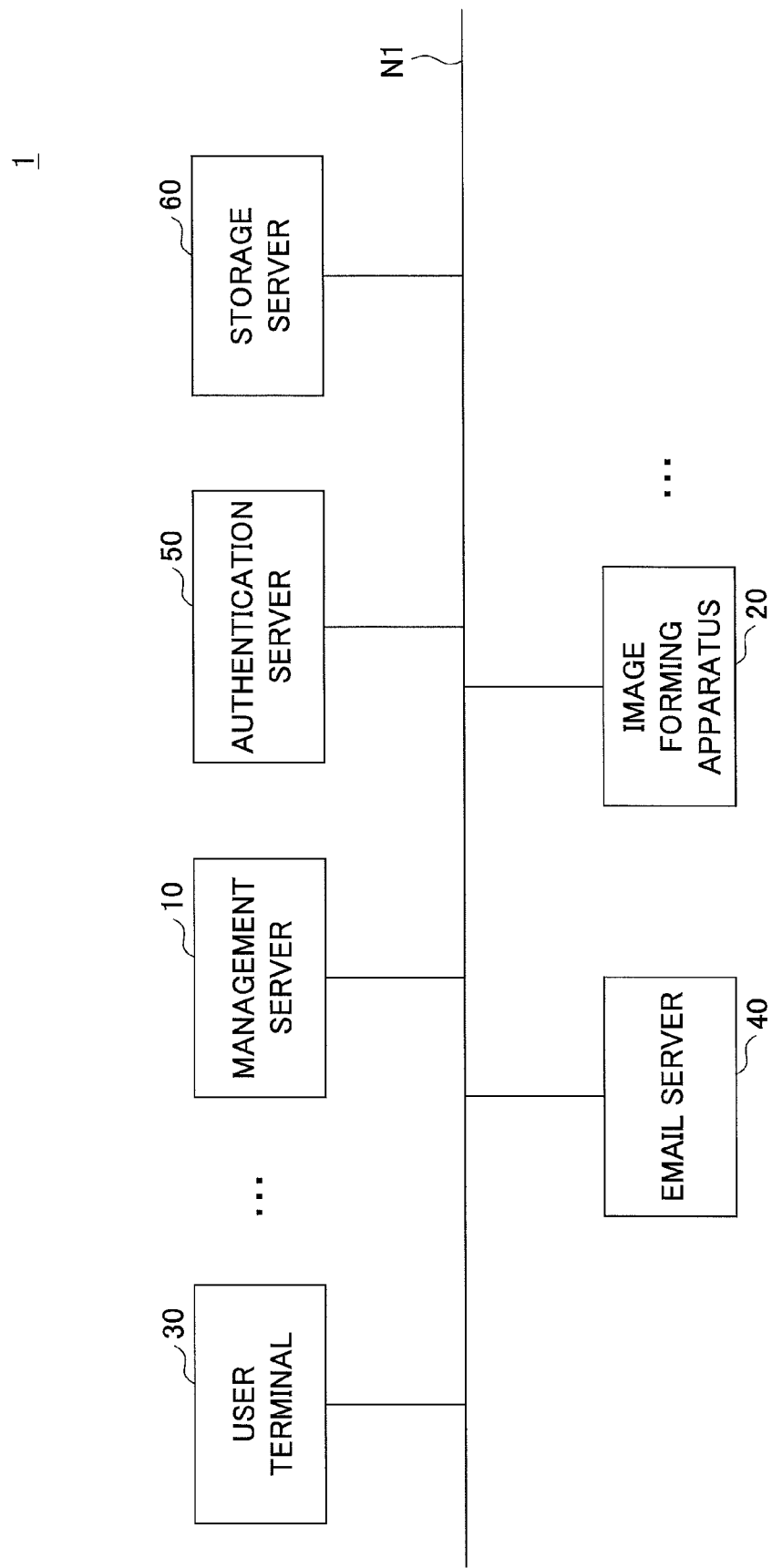
FIG. 1 is a drawing illustrating an exemplary configuration of a printing system according to a first embodiment.

Preferred embodiments of the present invention are described below with reference to the accompanying drawings. FIG. 1 is a drawing illustrating an exemplary configuration of a printing system 1 according to a first embodiment. As illustrated by FIG. 1, the printing system 1 may include one or more user terminals 30, an email server 40, a management server 10, an authentication server 50, a storage server 60, and one or more image forming apparatuses 20 that are connected to each other via a network N1 such as a local area network (LAN) or the Internet. A part or the entirety of the network N1 may be implemented by a radio communication network. Also, the user terminals 30 may be connected via a mobile communication network to the network N1. In the present embodiment, it is assumed that the printing system 1 is in operation in an organization such as a company. In the first embodiment, the organization is referred to as a "company A".

Each user terminal 30 is an information processing apparatus that is operated directly by a user of the printing system 1. For example, the user operates the user terminal 30 to enter a print request into the printing system 1. For example, the user terminal 30 may be implemented by a personal computer (PC), a cell phone, a smartphone, a tablet terminal, or a personal digital assistant (PDA). Also, multiple user terminals 30 may be implemented by different types of devices.

In the present embodiment, users of the printing system 1 include an authorized (or registered) user and a guest user. The authorized user indicates a user whose user information is registered in the printing system 1 (more specifically, in a user information storage unit 52 described later). That is, the authorized user is a user who is registered in the printing system 1 in advance and expected to use the printing system 1. An example of the authorized user is an employee of the company A. The guest user indicates a user whose user information is not registered in the printing system 1. That is, the guest user is a user who does not have a preassigned right to use the printing system 1. An example of the guest user is a person who is not an employee of the company A.

The email server 40 is a computer that transfers an email sent from the user terminal 30 and an email sent from the management server 10. For example, in response to an instruction from the user, the user terminal 30 sends an email including a print request to the management server 10. Electronic data to be printed is attached to the email including the print request. The electronic data may have any appropriate data format. Hereafter, an email sent from the user terminal 30 and including a print request is referred to as a "print request email".

The authentication server 50 is a computer that manages information (hereafter referred to as "user information") of respective users in the company A, and performs processes based on the user information. For example, when an authentication request including a user name and a password is received, the authentication server 50 performs an authentication process. The authentication server 50 also performs processes in response to a request to confirm whether an email address exists and a request to obtain a user name corresponding to an email address. The user information of a user includes an email address associated with a user name of the user.

The management server 10 is a computer that generates, for example, print data based on electronic data included in a received print request email. The print data has a data format that the image forming apparatus 20 can interpret. The management server 10 associates the generated print data with a user name of a user corresponding to the sender of the print request email or an identifier generated for the print request email, and sends the print data to the storage server 60. When a sender (or source) email address of the print request email is being managed by the authentication server 50 in association with a user name, the management server 10 associates the print data with the user name. When the sender (or source) email address of the print request email is not being managed by the authentication server 50 in association with a user name, the management server 10 associates the print data with an identifier generated in response to the print request email. Hereafter, the identifier is referred to as a "personal identification number (PIN) code".

The storage server 60 is a computer that stores print data sent from the management server 10.

The image forming apparatus 20 prints print data that is stored in the storage server 60 in association with a user name or a PIN code input by a user on the image forming apparatus 20.

Figure 2:
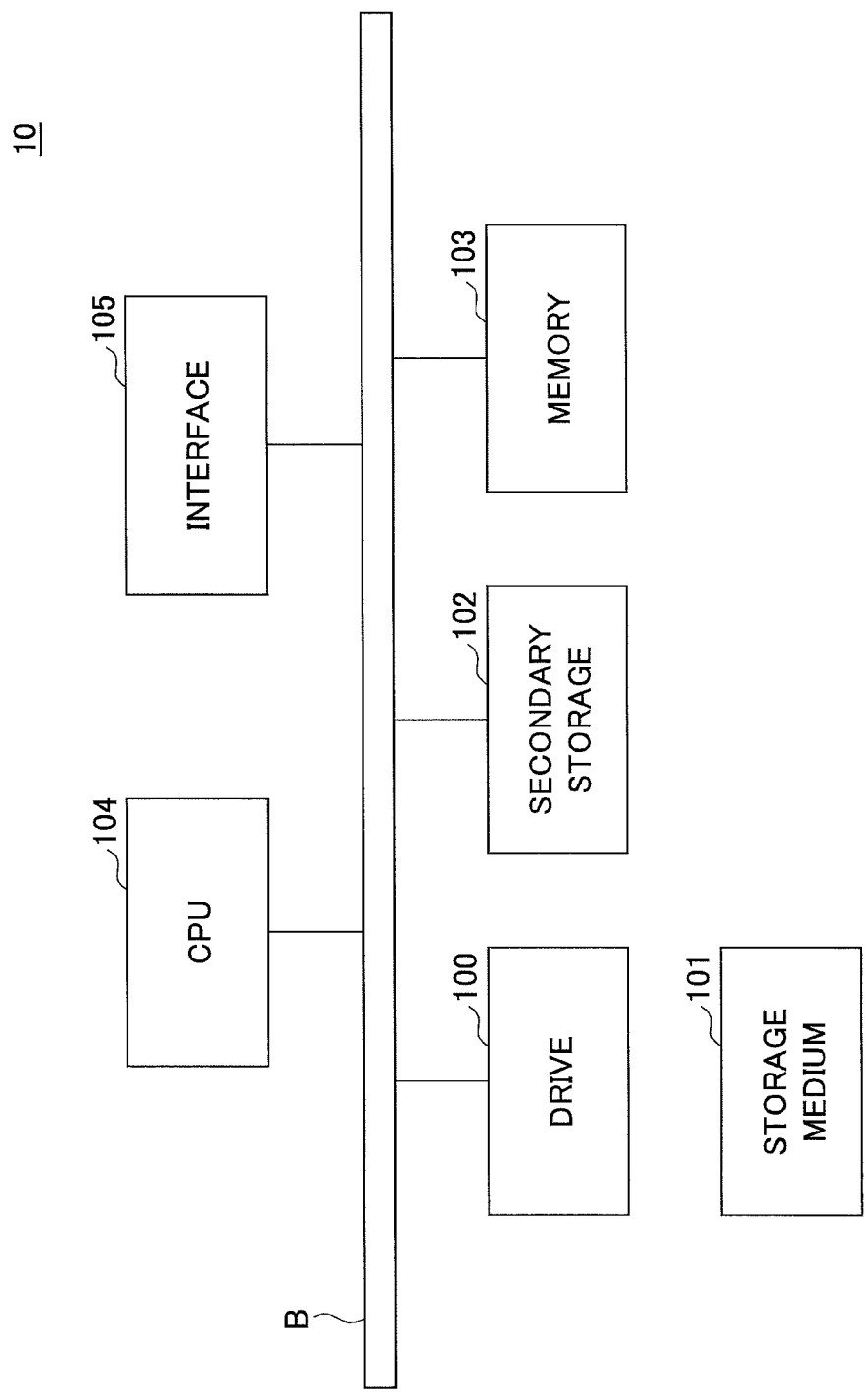
FIG. 2 is a block diagram illustrating an exemplary hardware configuration of a management server according to the first embodiment.

FIG. 2 is a block diagram illustrating an exemplary hardware configuration of the management server 10 according to the first embodiment. As illustrated by FIG. 2, the management server 10 may include a drive 100, a secondary storage 102, a memory 103, a central processing unit (CPU) 104, and an interface 105 that are connected to each other via a bus B.

Programs for implementing various processes at the management server 10 may be provided via a storage medium 101 such as a CD-ROM. When the storage medium 101 storing programs is mounted on the drive 100, the programs are read by the drive 100 from the storage medium 101 and are installed in the secondary storage 102. Programs may not necessarily be installed from the storage medium 101. For example, programs may be downloaded via a network from another computer. The secondary storage 102 stores the installed programs and other necessary files and data.

The memory 103 temporarily stores programs read from the secondary storage 102 when the programs are executed. The CPU 104 performs functions of the management server 10 according to the programs temporarily stored in the memory 103. The interface 105 connects the management server 10 to a network.

Figure 3:
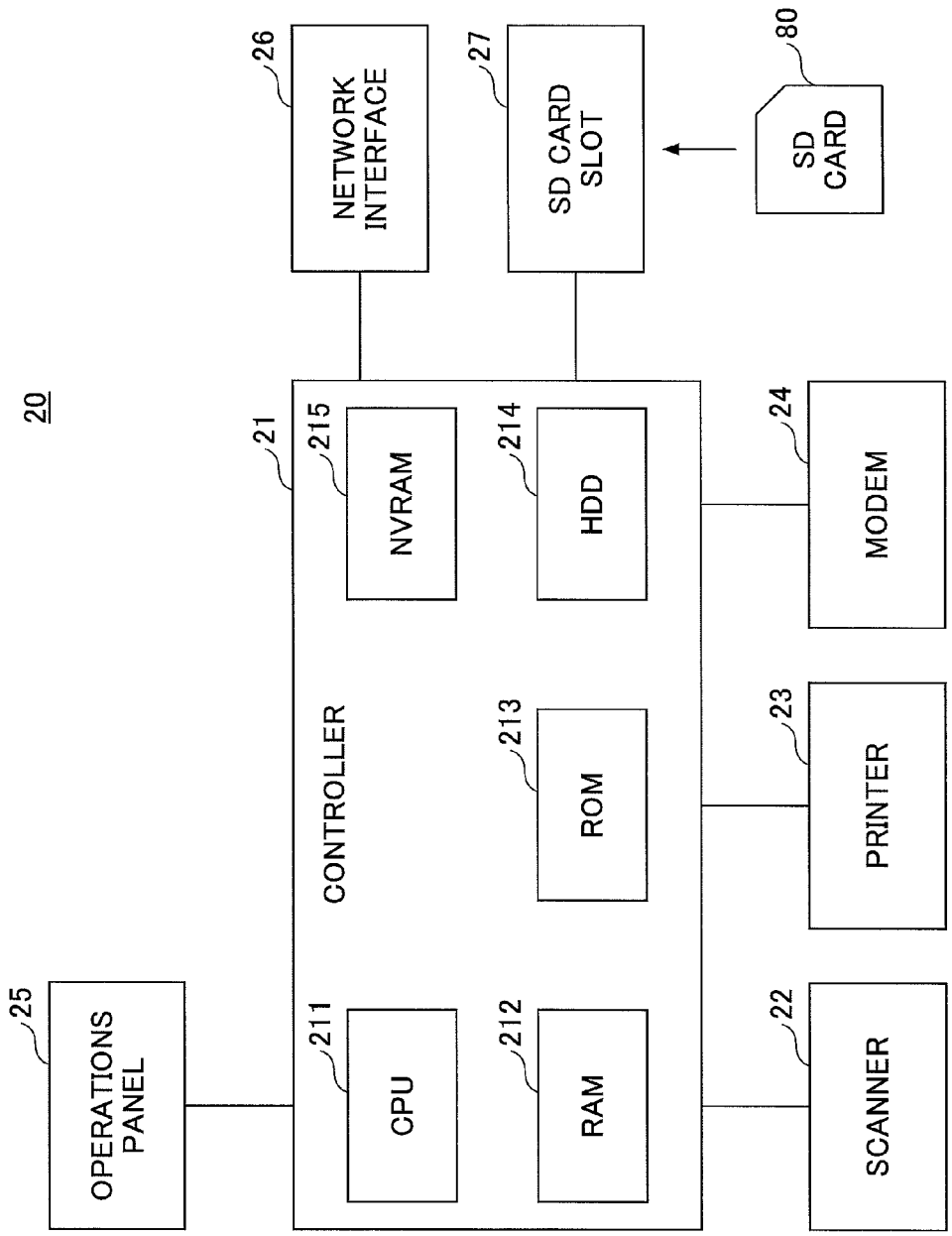
FIG. 3 is a block diagram illustrating an exemplary hardware configuration of an image forming apparatus according to the first embodiment.

FIG. 3 is a block diagram illustrating an exemplary hardware configuration of the image forming apparatus 20 according to the first embodiment. As illustrated by FIG. 3, the image forming apparatus 20 may include, as hardware components, a controller 21, a scanner 22, a printer 23, a modem 24, an operations panel 25, a network interface 26, and a secure digital (SD) card slot 27.

The controller 21 may include a CPU 211, a random access memory (RAM) 212, a read-only memory (ROM) 213, a hard disk drive (HDD) 214, and a non-volatile RAM (NVRAM) 215. The ROM 213 stores, for example, programs and data used by the programs. The RAM 212 is used, for example, as a storage area into which programs are loaded and as a work area for the loaded programs. The CPU 211 executes the programs loaded into the RAM 212 to implement various functions. The HDD 214 stores, for example, programs and data used by the programs. The NVRAM 215 stores, for example, various settings.

The scanner 22 is a hardware component (image scanning unit) for scanning a document to obtain image data. The printer 23 is a hardware component (printing unit) for printing print data on a recording medium such as paper. The modem 24 is a hardware component for connecting the image forming apparatus 20 to a telephone line and is used to send and receive image data via facsimile communications. The operations panel 25 is a hardware component including an input unit such as buttons for receiving user inputs and a display unit such as a liquid crystal display panel. For example, a liquid crystal display panel including a touch panel function may be used as the display unit. In this case, the liquid crystal display panel may also function as the input unit. The network interface 26 is a hardware component for connecting the image forming apparatus 20 to a (wired or wireless) network such as a local area network (LAN). The SD card slot 27 reads, for example, programs stored in a secure digital (SD) card 80. With the image forming apparatus 20 configured as described above, in addition to the programs stored in the ROM 213 and the HDD 214, programs stored in the SD card 80 can also be loaded into the RAM 212 and executed. Instead of the SD card 80, any other storage medium (e.g., a CD-ROM or a universal serial bus (USE) memory) may be used. That is, a storage medium that can be mounted on the image forming apparatus 20 is not limited to the SD card 80. When a storage medium other than the SD card 80 is used, the SD card slot 27 may be replaced with a hardware component corresponding to the storage medium used.

The scanner 22 and the modem 24 may be omitted from the image forming apparatus 20. That is, the image forming apparatus 20 may be implemented by a printer instead of a multifunction peripheral.

Figure 4:
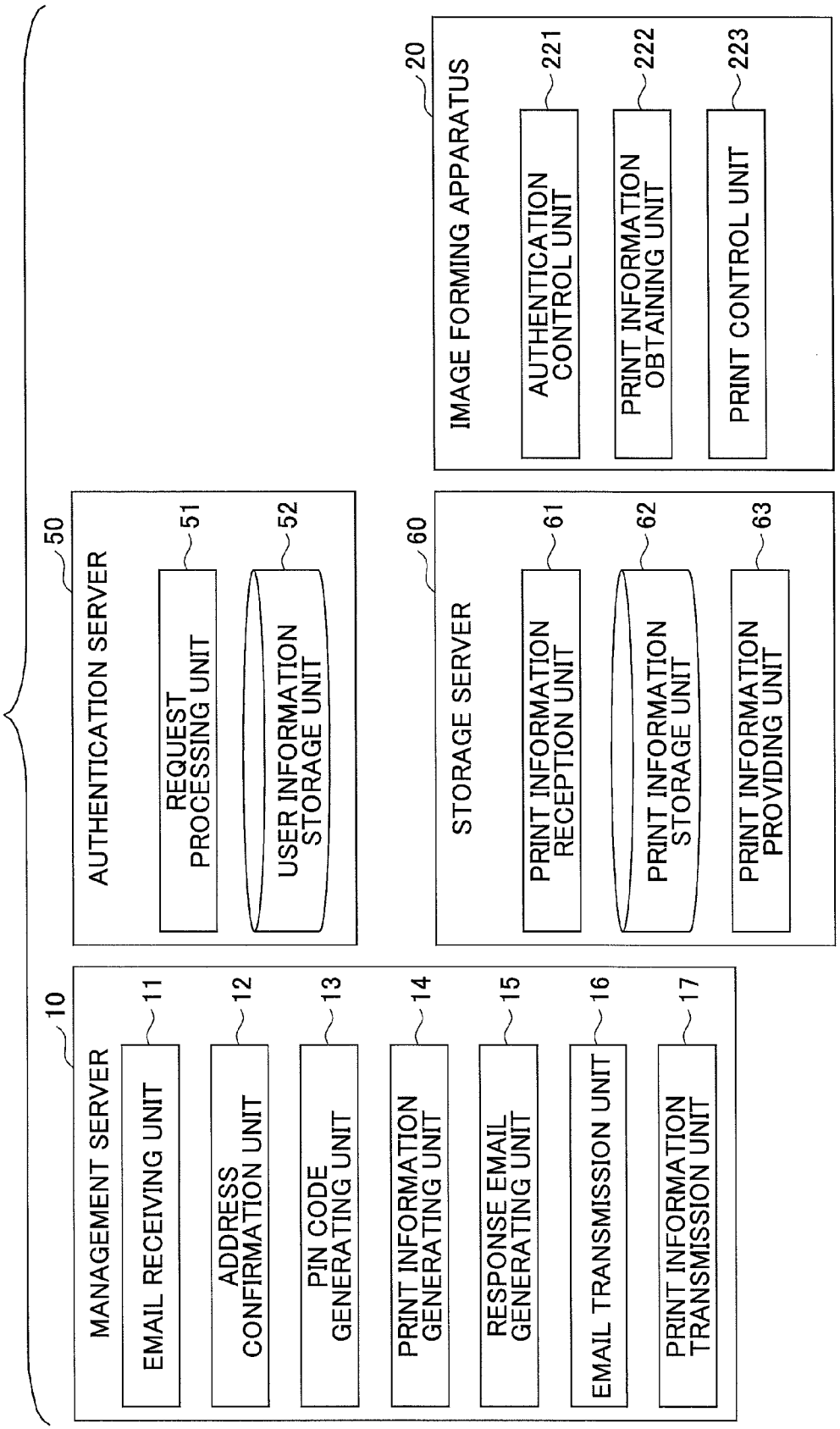
FIG. 4 is a drawing illustrating an exemplary functional configuration of a printing system according to the first embodiment.

FIG. 4 is a drawing illustrating an exemplary functional configuration of the printing system 1 according to the first embodiment. As illustrated by FIG. 4, the management server 10 may include an email receiving unit 11, an address confirmation unit 12, a pin code generating unit 13, a print information generating unit 14, a response email generating unit 15, an email transmission unit 16, and a print information transmission unit 17. These functional units may be implemented by executing one or more programs installed in the management server 10 by the CPU 104.

The email receiving unit 11 receives a print request email. The print request email includes print object data (e.g., an email body and/or attached data) that the user requests to print. For example, the user sends, from the user terminal 30, an email including print object data to an email address (destination) with a specific domain. When the destination of a received email includes the specific domain, the email receiving unit 11 determines that the received email is a print request email.

The address confirmation unit 12 sends an address confirmation request to request the authentication server 50 to confirm whether a sender (source) email address of the print request email is registered in the authentication server 50. When the sender email address is registered in the authentication server 50, the address confirmation unit 12 receives a user name corresponding to the sender email address from the authentication server 50. The PIN code generating unit 13 generates a PIN code when the sender email address is not registered in the authentication server 50. The print information generating unit 14 generates print information corresponding to the print request email. The print information includes print data, information related to a print job for the print data, and a user name or a PIN code.

The response email generating unit 15 generates an email (hereafter referred to as a "response email") to be sent as a response to the print request email. The response email includes identification information of the print job for the print data. When a PIN code is generated in response to the print request email, the PIN code is also included in the response email.

The email transmission unit 16 sends the response email to the sender email address in the print request email. The print information transmission unit 17 sends the print information to the storage server 60 to store the print information in the storage server 60.

The authentication server 50 may include a request processing unit 51 and a user information storage unit 52. The user information storage unit 52 stores user information for each authorized user. The request processing unit 51 performs processes in response to an authentication request, an address confirmation request, and a user name request. The request processing unit 51 may be implemented by executing a program installed in the authentication server 50 by a CPU of the authentication server 50. The user information storage unit 52 may be implemented, for example, by a secondary storage of the authentication server 50 or a storage device connected via a network to the authentication server 50.

The storage server 60 may include a print information reception unit 61, a print information storage unit 62, and a print information providing unit 63. The print information reception unit 61 receives print information sent from the management server 10, and stores the received print information in the print information storage unit 62. When a print information request is received from the image forming apparatus 20, the print information providing unit 63 sends, to the image forming apparatus 20, print information that is stored in the print information storage unit 62 and includes a user name or a PIN code specified in the print information request.

The print information reception unit 61 and the print information providing unit 63 may be implemented by executing one or more programs installed in the storage server 60 by a CPU of the storage server 60. The print information storage unit 62 may be implemented, for example, by a secondary storage of the storage server 60 or a storage device connected via a network to the storage server 60.

The image forming apparatus 20 may include an authentication control unit 221, a print information obtaining unit 222, and a print control unit 223. These functional units may be implemented by executing one or more programs installed in the image forming apparatus 20 by the CPU 211. The authentication control unit 221 receives, from a user, a user name and a password, or a PIN code. When a user name and a password are entered, the authentication control unit 221 requests the authentication server 50 to perform authentication based on the user name and the password. The print information obtaining unit 222 sends a print information request to the storage server 60. The print information request includes at least one of the user name and the PIN code received by the authentication control unit 221. The print control unit 223 performs a printing process for print data obtained by the print information obtaining unit 222.

Figure 5:
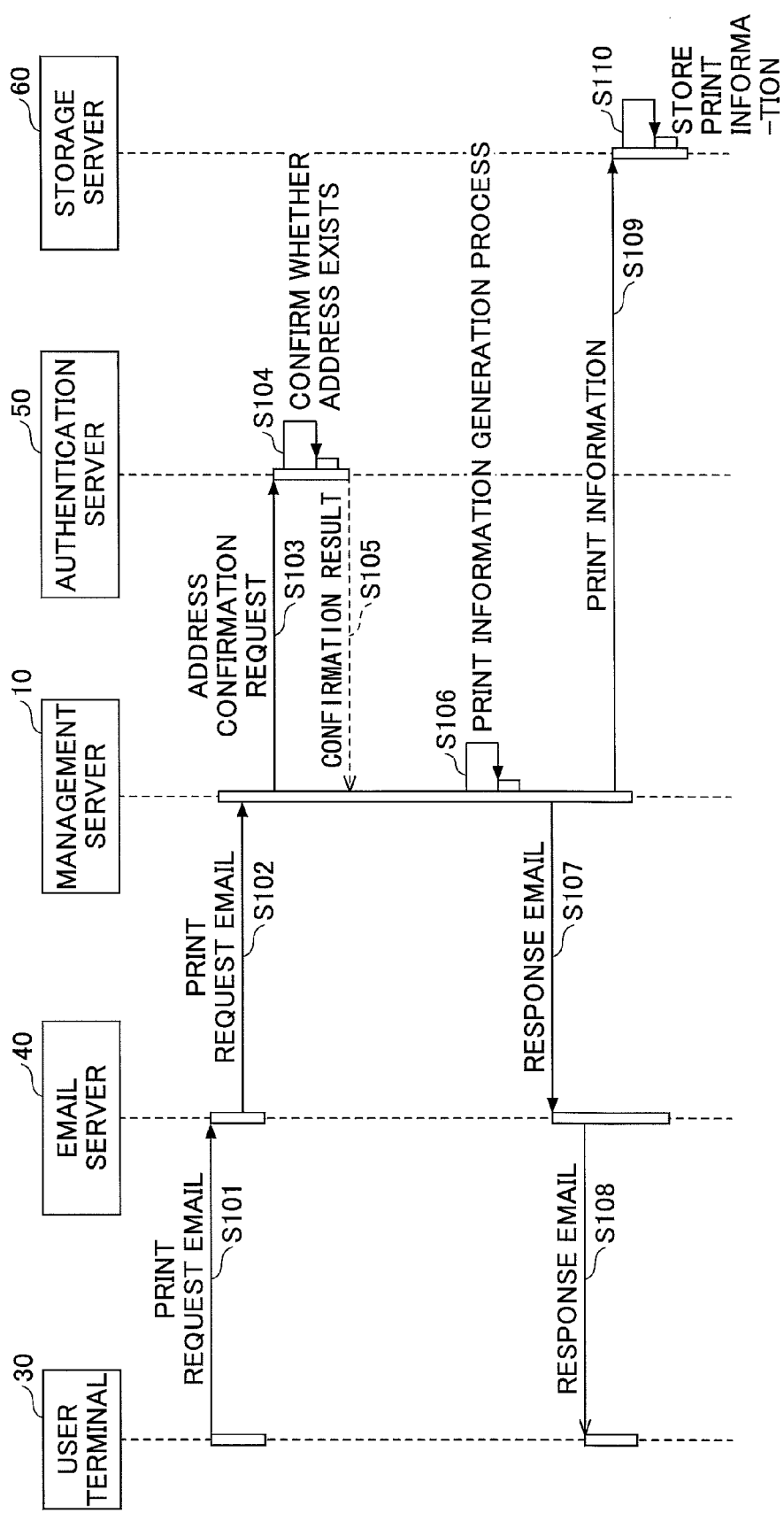
FIG. 5 is a sequence chart illustrating an exemplary print data storing process according to the first embodiment.

An exemplary process performed by the printing system 1 is described below. FIG. 5 is a sequence chart illustrating an exemplary print data storing process according to the first embodiment.

At step S101, in response to an instruction from the user, the user terminal 30 sends a print request email to a predetermined email address. Electronic data to be printed is attached to the print request email. The predetermined email address is an email address assigned in advance to the management server 10.

The email server 40 transfers the print request email to the management server 10 according to a known communication protocol for transferring emails (S102).

The print request email is received by the email receiving unit 11 of the management server 10. When the print request email is received, the management server 10 sends an address confirmation request including a sender (source) email address of the print request email to the authentication server 50 (S103). When the address confirmation request is received, the request processing unit 51 of the authentication server 50 determines whether the sender email address specified in the address confirmation request is stored in the user information storage unit 52 (S104).

FIG. 6 is a table illustrating an exemplary configuration of the user information storage unit 52. As illustrated by FIG. 6, the user information storage unit 52 stores records of user information for respective authorized users. The user information includes, for example, a user name, a password, and an email address. The user information of one user may include multiple email addresses (e.g., an email address for a PC and an email address for a mobile terminal).

At step S104, the request processing unit 51 determines whether the sender email address specified in the address confirmation request is included in any one of the records of user information stored in the user information storage unit 52.

Next, the request processing unit 51 sends a response including a confirmation result to the management server 10 (S105). The confirmation result indicates whether the sender email address exists in the user information storage unit 52 (i.e., whether the sender email address is included in any one of the records of user information stored in the user information storage unit 52).

When receiving the confirmation result, the management server 10 performs a process (print information generating process) for generating print information for the print request email (S106). Then, the email transmission unit 16 of the management server 10 sends a response email for the print request email to the sender email address in the print request email (S107). The response email is transferred by the email server 40 to the user terminal 30 that has sent the print request email (S108). The response email is generated in the print information generating process.

After the response email is sent, the print information transmission unit 17 of the management server 10 sends the print information to the storage server 60 (S109). The print information includes print data generated in the print information generating process and information associated with the print data.

When receiving the print information, the print information reception unit 61 of the storage server 60 stores the received print information in the print information storage unit 62 (S110).

FIG. 7 is a table illustrating an exemplary configuration of the print information storage unit 62 according to the first embodiment. As illustrated by FIG. 7, the print information storage unit 62 stores print information for each set of print data. The print information includes a user name, a user mode, a job name, a request identification number, a data identification number, a file path name, and date and time.

The job name is identification information assigned to each set of print data or to a print job executed for the print data. The user mode is information indicating whether a sender (source) email address of a print request email is stored in the user information storage unit 52. That is, in the present embodiment, the user mode indicates whether a user requesting printing is an authorized (or registered) user or a guest user. In FIG. 7, "U" indicates an authorized user and "G" indicates a guest user. The user name indicates the name of an authorized user requesting printing. The request identification number and the data identification number constitute a PIN code assigned to a print request email sent from a guest user requesting printing. That is, a PIN code is represented by a combination of a request identification number and a data identification number. The request identification number and the data identification number are included (or valid) in print information for a guest user. Details of the request identification number and the data identification number are described later. The file path name indicates a path name of a file containing print data. The date and time indicates, for example, when print information is generated.

Figure 8:
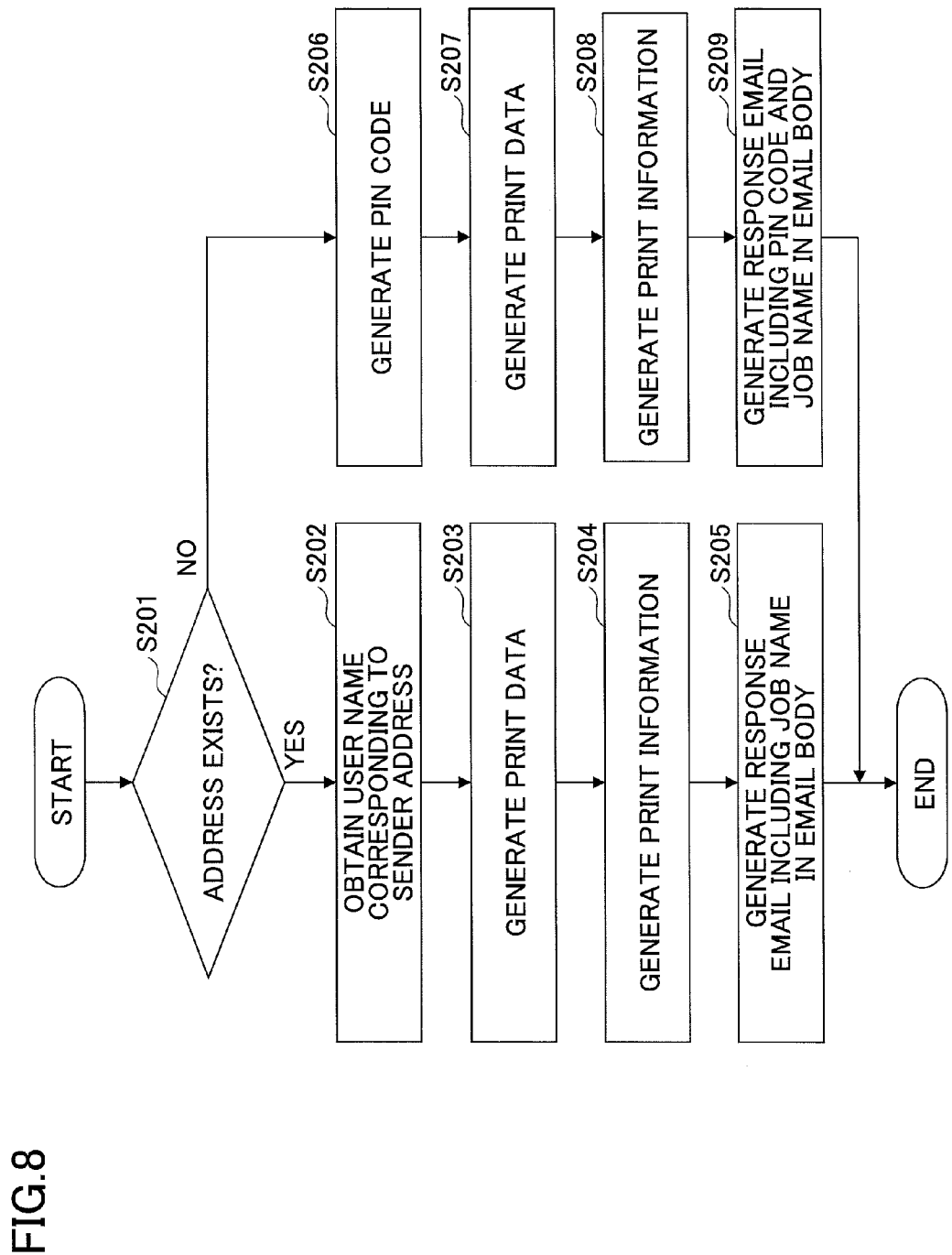
FIG. 8 is a flowchart illustrating an exemplary print information generating process according to the first embodiment.

Details of step S106 are described below. FIG. 8 is a flowchart illustrating an exemplary print information generating process according to the first embodiment;

At step S201, the address confirmation unit 12 determines whether the confirmation result received at step S105 of FIG. 5 indicates that the sender email address of the print request email exists (or is stored) in the user information storage unit 52. When the confirmation result indicates that the sender email address exists (YES at S201), the address confirmation unit 12 obtains a user name corresponding to the sender email address from the authentication server 50 (S202). In other words, the address confirmation unit 12 obtains a user name that is stored in the user information storage unit 52 in association with the sender email address.

Next, the print information generating unit 14 generates print data for each of an email body and attached data (print object data) of the print request email (S203). When multiple sets of data are attached to the print request email, the print information generating unit 14 generates print data for each of the sets of attached data. Accordingly, when the number of sets of attached data is N, N+1 sets of print data are generated. Here, +1 indicates print data generated for the email body. Alternatively, print data may be generated only for attached electronic data. When the attached data is an archive file such as a zip file containing multiple files, the print information generating unit 14 extracts the files from the archive file and generates print data for each of the extracted files. Thus, multiple sets of print data (print jobs) may be generated for one print request email.

Next, the print information generating unit 14 generates print information for each set of print data (S204). More specifically, the print information generating unit 14 generates a job name for each set of print data, and includes the job name in the print information. In this case, "U" is set as the user mode in each set of print information. Also, the user name obtained at step S202 is set in the print information. Further, the date and time when the print information is generated is set in the print information. One or more sets of print information generated at step S204 are sent to the storage server 60 at step S109 of FIG. 5.

Then, the response email generating unit 15 generates a response email that includes the job names of sets of print information in, for example, the email body (S205). The generated response email is transferred at steps S107 and S108 of FIG. 5 to the user terminal 30 that has sent the print request email. The user reads the response email and identifies the job names corresponding to sets of print data generated in response to the print request email. When the sender email address exists in the user information storage unit 52, the response email may not necessarily be sent to the user terminal 30. For example, when a job name is generated based on the file name of electronic data, the user can determine, without receiving the response email, the contents of print data based on the job name displayed on the image forming apparatus 20.

When the confirmation result indicates that the sender email address does not exist (NO at S201), the PIN code generating unit 13 generates PIN codes for the print request email (S206). In the present embodiment, each PIN code has a format as indicated below.

<DATA IDENTIFICATION NUMBER>#<REQUEST IDENTIFICATION NUMBER>

That is, a PIN code is represented by a data identification number and a request identification number that are separated by a delimiter "#". The data identification number and the request identification number may be arranged in the reverse order in the PIN code and may be combined in a different manner. Also, when the number of digits of at least one of the data identification number and the request identification number is fixed, the delimiter may be omitted. This is because the boundary between the data identification number and the request identification number can be identified when the number of digits of one of them is fixed.

The data identification number is an identification number that is unique to each set of print data generated based on the print request email (i.e., each of sets of print data generated for the email body and the attached data). The request identification number (or print request identification number) is an identification number unique to each print request email. Accordingly, the request identification number is common to multiple sets of print information that are generated based on the same print request email.

For example, when a print request email includes six sets of attached data, data identification numbers as illustrated by FIG. 9 are assigned to sets of print data generated for the email body and the attached data FIG. 9 is a table illustrating exemplary data identification numbers.

When a print request email includes six sets of attached data, a total of seven data identification numbers are assigned to (sets of print data of) the email body and the attached data of the print request email. In FIG. 9, "03" is assigned as a data identification number to the email body. In the present embodiment, "03" is reserved as the data identification number for the email body. Accordingly, "03" is commonly used as the data identification number for email bodies of all print request emails sent from guest users. Alternatively, different data identification numbers for the email body may be used for different print request emails or different guest users (i.e., email addresses of guest users). Also in FIG. 9, data identification numbers 1 through 6 are assigned to sets of attached data. The data identification numbers in FIG. 9 are just examples. Data identification numbers may be represented by other values and may include characters or symbols. That is, data identification numbers may be generated in any appropriate manner unless duplicate data identification numbers are assigned to sets of print data generated for one print request email. The request identification number may be generated in any appropriate manner unless the request identification number becomes identical with a request identification number included in a PIN code associated with print information currently stored in the print information storage unit 62. A PIN code is preferably composed of characters that can be easily entered via the operations panel 25 of the image forming apparatus 20 or a software keyboard displayed on the operations panel 25. In the present embodiment, a PIN code includes a request identification number that is commonly used for sets of print data or print information generated in response to one print request email. This, for example, makes it easier for the user to remember the PIN code.

Alternatively, the request identification number may be generated for each guest user instead of for each print request email. In other words, the same request identification number may be assigned to multiple print request emails from the same guest user. For example, the PIN code generating unit 13 stores the request identification number in the secondary storage 102 in association with the sender email address of the print request email from the guest user. When a print request email includes a sender email address that is the same as the sender email address stored in the secondary storage 102 in association with the request identification number, the PIN code generating unit 13 assigns the same request identification number to the print request email. In this case, data identification numbers need to be selected or generated such that they do not become identical with the data identification numbers included in sets of print information currently stored in the print information storage unit 62 and having the same request identification number.

Next, the print information generating unit 14 generates print data for each of the email body and the attached data (print object data) of the print request email (S207). In other words, the print information generating unit 14 generates print data for each of the data identification numbers. The process of step S207 is substantially the same as step S203.

Next, the print information generating unit 14 generates print information for each set of print data (S208). More specifically, the print information generating unit 14 generates a job name for each set of print data, and includes the job name in the print information. In this case, "G" is set as the user mode in each set of print information. Also, the data identification number and the request identification number constituting the PIN code generated at step S206 are set in the print information. The data identification number is set in the print information of print data that corresponds to the data identification number. Also, the date and time when the print information is generated is set in the print information. One or more sets of print information generated at step S208 are sent to the storage server 60 at step S109 of FIG. 5.

Then, the response email generating unit 15 generates a response email that includes the job names of sets of print information and the PIN codes in, for example, the email body (S209). The response email includes PIN codes for respective sets of print information as exemplified by FIG. 10.

FIG. 10 is a table illustrating exemplary PIN codes in a response email. In the example of FIG. 10, PIN codes are assigned to respective print objects (i.e., sets of data to be printed). In FIG. 10, "1234" indicates the request identification number.

The print objects in FIG. 10 include, in addition to the email body and sets of attached data, "selected when printing", "email body+all sets of attached data", and "all sets of attached data". A data identification number "00" is assigned to "selected when printing", a data identification number "01" is assigned to "email body+all sets of attached data", and a data identification number "02" is assigned to "all sets of attached data". In the present embodiment, similarly to "03" reserved for the email body, "00", "01", and "02" are reserved as data identification numbers. Each of "01" and "02" is a data identification number assigned to a combination of multiple print objects (sets of print data).

Including multiple PIN codes in one response email makes it possible to change print objects depending on the PIN codes entered into the image forming apparatus 20. That is, the user can specify a print object by entering the corresponding PIN code.

Although the correspondence between the PIN codes and the print objects is represented in a table format in FIG. 10, the correspondence between the PIN codes and the print objects is not necessarily represented in a table format in the response email. The correspondence between the PIN codes and the print objects may be represented in any format that is understandable for a user who reads the response email.

Also, when the rules for assigning data identification numbers and the meaning of reserved numbers are known to the user, the response email may simply include one request identification number. In this case, the user can identify a PIN code corresponding to a desired print object based on the request identification number.

The response email generated at step S209 is transferred at steps S107 and S108 of FIG. 5 to the user terminal 30 that has sent the print request email. The user reads the response email and identifies the PIN codes corresponding to sets of print data generated in response to the print request email. The user needs to enter the PIN codes in the image forming apparatus 20 to print the corresponding sets of print data. With the response email, the user can also identify the job names corresponding to the sets of print data. However, the job names are not necessarily included in the response email.

Thereafter, the user who has sent the print request email moves to a location where the image forming apparatus 20 is installed, and operates the image forming apparatus 20. Next, an exemplary process performed by the image forming apparatus 20 in response to user operations is described.

Figure 11:
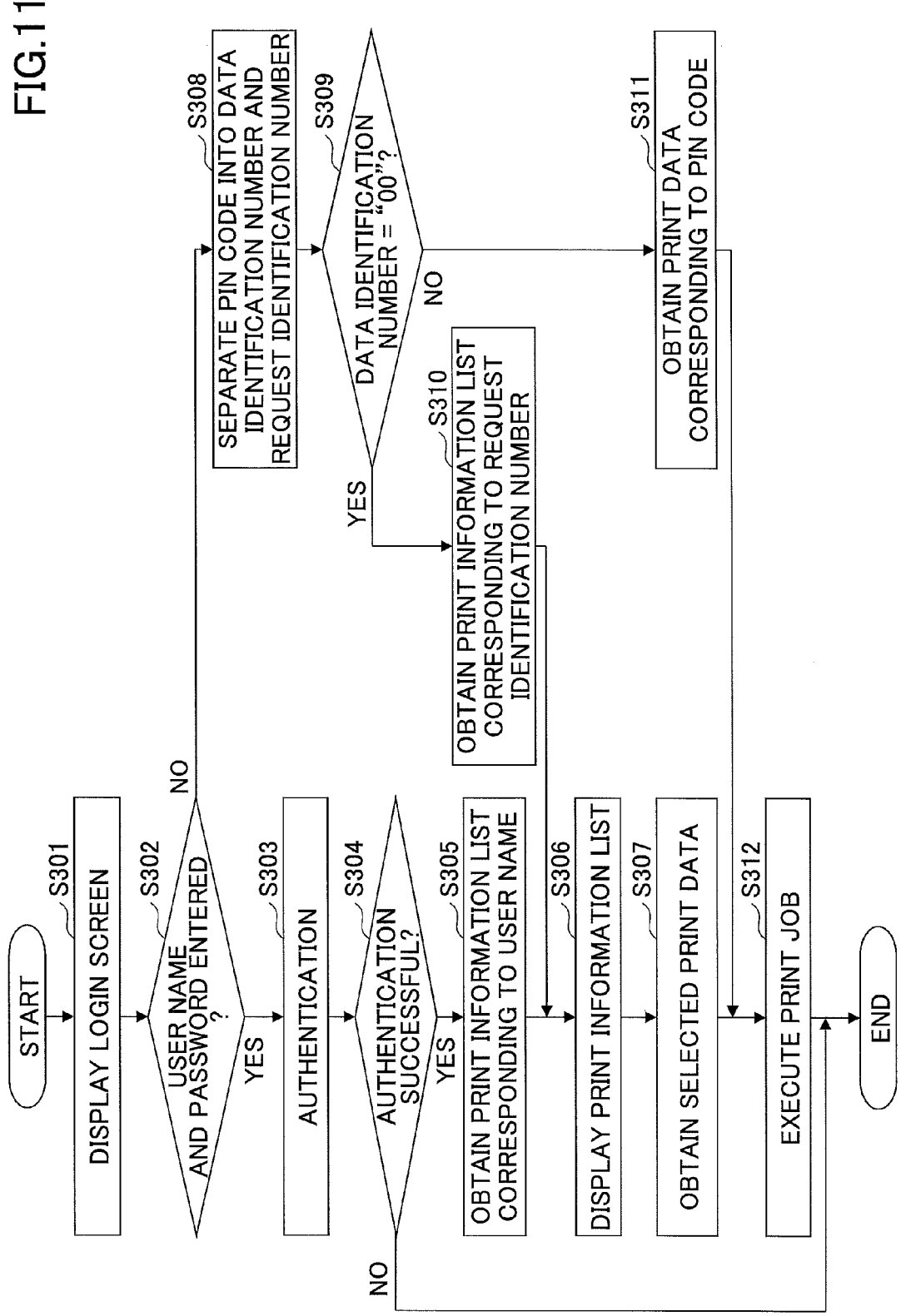
FIG. 11 is a flowchart illustrating an exemplary process performed by an image forming apparatus according to the first embodiment.

FIG. 11 is a flowchart illustrating an exemplary process performed by the image forming apparatus 20 according to the first embodiment.

For example, when a print function for printing print data stored in the storage server 60 is called, the authentication control unit 221 displays a login screen on the operations panel 25 (S301).

Figure 12:
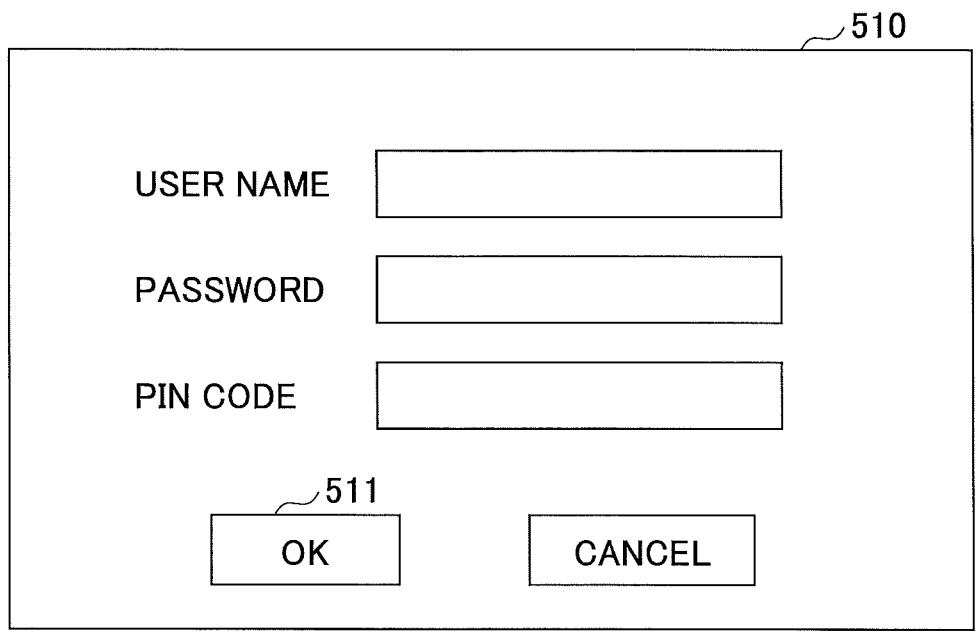
FIG. 12 is a drawing illustrating an exemplary login screen.

FIG. 12 is a drawing illustrating an exemplary login screen 510. As illustrated by FIG. 12, the login screen 510 includes entry fields for entering a user name, a password, and a PIN code.

When the operator of the image forming apparatus 20 is an authorized user, the operator enters a user name and a password on the login screen 510. On the other hand, when the operator is a guest user, the operator enters, on the login screen 510, a PIN code corresponding to a print object that the operator intends to print. The PIN code is selected from PIN codes reported via a response email. For example, when the operator intends to select a print object when printing (i.e., select a print object from a list), the operator enters a PIN code including "00" as the data identification number.

When a user name and a password, or a PIN code is entered on the login screen 510 and an OK button 511 is pressed, the authentication control unit 221 determines whether a user name and a password are entered on the login screen 510 (S302). When a user name and a password are entered (YES at S302), the authentication control unit 221 performs an authentication process (S303). More specifically, the authentication control unit 221 sends an authentication request including the entered user name and password to the authentication server 50. The request processing unit 51 of the authentication server 50 determines whether the combination of the user name and the password specified in the authentication request is stored in the user information storage unit 52. When the combination of the user name and the password are stored in the user information storage unit 52, the request processing unit 51 determines that the authentication is successful. When the combination of the user name and the password are not stored in the user information storage unit 52, the request processing unit 51 determines that the authentication has failed. The request processing unit 51 sends information indicating the authentication result to the authentication control unit 221 of the image forming apparatus 20 that has sent the authentication request.

When the authentication is successful (YES at S304), the print information obtaining unit 222 obtains, from the storage server 60, a list of sets of print information (print information list) corresponding to the user name entered on the login screen 510 (S305). More specifically, the print information obtaining unit 222 sends a print information list request including the user name to the storage server 60. When receiving the print information list request, the print information providing unit 63 of the storage server 60 obtains one or more sets of print information including the user name specified in the print information list request from the print information storage unit 62 (see FIG. 7). That is, when a user name and a password are entered on the login screen 510, the print information providing unit 63 obtains one or more sets of print information including the user mode "U" and the user name. The print information providing unit 63 sends a list of the obtained sets of print information (print information list) to the image forming apparatus 20. The print information sent to the image forming apparatus 20 at step S305 preferably does not include print data. When the authentication has failed (NO at S304), step S305 is not performed.

After step S305, the print information obtaining unit 222 of the image forming apparatus 20 displays, on the operations panel 25, a list of, for example, job names included in the print information list received from the storage server 60 (S306). The displayed list indicates candidates to be printed. Accordingly, the user can select print information from the displayed list and request printing of print data corresponding to the selected print information.

When the user selects at least one job name from the displayed list, the print information obtaining unit 222 obtains print data corresponding to the selected job name from the storage server 60 (S307). More specifically, the print information obtaining unit 222 sends a print data request including the selected job name to the storage server 60. When receiving the print data request, the print information providing unit 63 of the storage server 60 sends print data corresponding to the job name specified in the print data request to the image forming apparatus 20.

When only one set of print information is obtained based on the specified user name in step S305, the print information obtaining unit 222 may obtain the corresponding print data without performing step S306. Also, instead of sending a print information list to the image forming apparatus 20, the print information providing unit 63 may send print data identified based on the specified user name to the image forming apparatus 20.

Next, the print control unit 223 controls execution of a print job for the obtained print data (S312). As a result, the print data is printed on a recording medium such as paper, and the recording medium is output from the image forming apparatus 20.

On the other hand, when a PIN code is entered on the login screen 510 (NO at S302), the print information obtaining unit 222 separates the PIN code into a data identification number and a request identification number (S308). For example, the print information obtaining unit 222 separates the PIN code into a data identification number and a request identification number based on a delimiter. Next, the print information obtaining unit 222 determines whether the data identification number is "00" (S309). That is, the print information obtaining unit 222 determines whether the user specified "selected when printing" instead of specific print data.

When the data identification number is "00" (YES at S309), the print information obtaining unit 222 obtains a list of sets of print information (print information list) corresponding to the entered PIN code from the storage server 60 (S310). More specifically, the print information obtaining unit 222 sends a print information list request including the PIN code to the storage server 60. When receiving the print information list request, the print information providing unit 63 of the storage server 60 determines that the data identification number of the PIN code is "00" and determines that it is necessary to obtain all sets of print information including the request identification number of the PIN code. The print information providing unit 63 obtains all sets of print information including the request identification number from the print information storage unit 62 (see FIG. 7). That is, when a PIN code including the data identification number "00" is entered on the login screen 510, the print information providing unit 63 obtains all sets of print information including the user mode "G" and the request identification number of the PIN code.

Next, step S306 and the subsequent steps are performed based on the print information list obtained at step S310.

When the data identification number is not "00" (NO at S309), the print information obtaining unit 222 obtains one or more sets of print information corresponding to the entered PIN code from the storage server 60 (S311). More specifically, the print information obtaining unit 222 sends a print information request including the PIN code to the storage server 60. When receiving the print information request, the print information providing unit 63 of the storage server 60 identifies one or more sets of print information to be obtained from the print information storage unit 62, based on the data identification number of the PIN code.

When the data identification number is "01", the print information providing unit 63 obtains all sets of print information including the request identification number of the PIN code. When the data identification number is "02", the print information providing unit 63 obtains sets of print information that include the request identification number of the PIN code and do not include the data identification number "03" (i.e., excluding print information for the mail body). When the data identification number is neither one of "01" and "02", the print information providing unit 63 obtains a set of print information including the data identification number and the request identification number of the PIN code.

The print information obtained at step S311 preferably includes print data. Also, only print data itself may be obtained at step S311. Next, step S312 is performed for the print data in the obtained print information. Thus, in this case, a print job is executed for a print object(s) specified by the PIN code without performing the steps of displaying a print information list and selecting a print object from the displayed print information list.

As described above, the first embodiment makes it possible to give a printing right even to a guest user whose account, e.g., a user name and a password, is not registered in the authentication server 50. This in turn reduces the need for a guest user to ask an authorized user to print a document. According to the first embodiment, PIN codes are reported to a guest user in response to a print request email. This makes it possible to give a virtual and temporary account to the guest user. With this configuration, a guest user can access only print data that is generated in response to a print request email sent from the guest user. Accordingly, this configuration makes it possible to prevent a guest user from accessing print data of other guest users.

Also, the first embodiment makes it possible to reduce the need to provide an image forming apparatus 20 dedicated to guest users.

According to the first embodiment, a guest user can specify a print object with a PIN code. When the data identification number of an entered PIN code is not "00", a print job is immediately executed without performing steps of displaying a print information list and selecting a print object from the displayed print information list. This is because the print object is uniquely identified by the data identification number of the entered PIN code. A guest user who performs printing using a PIN code is typically a visitor to a company. A visitor normally desires to immediately execute a print job corresponding to a print request email during the visit to the company. Also, a visitor normally desires to execute a print job for all sets of print information generated in response to a print request email. Accordingly, the steps of displaying a print information list and selecting a print object from the print information list may be bothersome for a guest user.

On the other hand, when an email body and all sets of attached data are always automatically printed in response to entry of a PIN code, it is inflexible and may result in waste of printing paper and toner. That is, in some cases, a guest user may also desires to limit print objects.

For the above reasons, according to the present embodiment, a PIN code including a data identification number for identifying a print object(s) is entered into the image forming apparatus 20. This configuration makes it possible to limit print objects as well as to immediately execute a print job.

In the present embodiment, to make it easier for a user to remember and enter PIN codes, the same request identification number is included in all PIN codes assigned to sets of print data generated in response to the same print request email. However, different request identification numbers may be used for different sets of print data. Also, a PIN code may be composed only of a data identification number. In this case, the length of a data identification number is preferably longer than the length of data identification numbers provided as examples in the above descriptions. This is because a PIN code also functions as a security code to protect print data of a guest user. When the number of digits of a PIN code is small, the PIN code can be easily identified by other users.

When multiple print request emails are sent from the same guest user, multiple response emails including different PIN codes are sent to the user terminal 30 of the guest user. Taking into account such a case, the login screen 510 may be configured to accept multiple PIN codes. In this case, the print information obtaining unit 222 may be configured to obtain sets of print information corresponding to the PIN codes from the storage server 60. This configuration eliminates the need to repeat steps such as displaying the login screen 510 and displaying a print information list for each PIN code.

In the present embodiment, a user name of a guest user is not identified. Therefore, even when a log is recorded for a printing process performed on the image forming apparatus 20, it is difficult to identify a guest user who requested the printing process. For this reason, the image forming apparatus 20 may be configured to impose limitations (e.g., limiting the number of pages printable, disabling color printing, etc.) on printing of print data corresponding to print information obtained based on a PIN code. This makes it possible to prevent the abuse of anonymity to, for example, print a large number of pages An expiration date (or time) may be set for a PIN code. In this case, the PIN code becomes invalid after the expiration date (or time).

Also, the sender email address of a print request email which is not stored in the user information storage unit 52 may be recorded in a log in place of a user name. Including information such as an email address that can be used to identify a person in a log may function as a psychological deterrent to prevent the abuse of anonymity.

Next, a second embodiment is described. Below, differences between the first and second embodiments are mainly described. Accordingly, configurations and methods of the second embodiment that are not described below may be substantially the same as those of the first embodiment.

In the second embodiment, similarly to a cloud service, functions of the management server 10, the authentication server 50, and the storage server 60 are provided via the Internet. Accordingly, in the second embodiment, the user terminal 30 and the email server 40 are connected via the Internet to the management server 10, and the image forming apparatus 20 is connected via the Internet to the authentication server 50 and the storage server 60.

Figure 13:
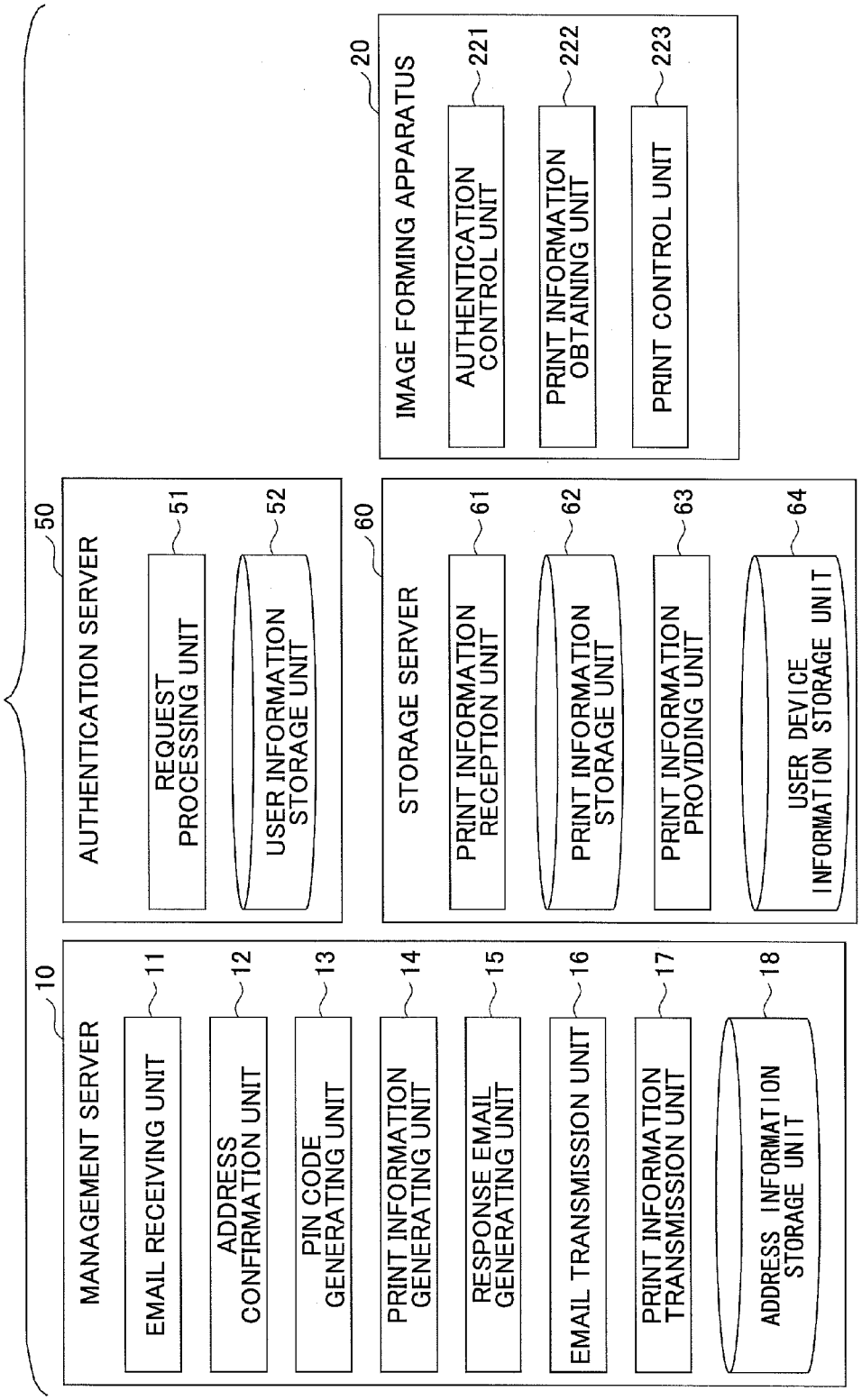
FIG. 13 is a drawing illustrating an exemplary functional configuration of a printing system according to a second embodiment.

FIG. 13 is a drawing illustrating an exemplary functional configuration of a printing system according to the second embodiment. In FIG. 13, the management server 10 further includes an address information storage unit 18. The address information storage unit 18 stores, for respective corporate users, email addresses of the management server 10 that are assigned to the corporate users. The address information storage unit 18 may be implemented, for example, by the secondary storage 102 or a storage device connected via a network to the management server 10.

The storage server 60 further includes a user device information storage unit 64. The user device information storage unit 64 stores, in association with each corporate user, identification information (device ID) of each image forming apparatus 20 installed in the company of the corporate user.

A print data storing process of the second embodiment is substantially the same as the print data storing process described above with reference to FIG. 5, except for some steps. At step S101, the user terminal 30 sends a print request email to an email address of the management server 10 which is assigned to a corporate user where the image forming apparatus 20 to be used for printing is installed (or a corporate user to which the image forming apparatus 20 belongs).

The email receiving unit 11 of the management server 10 identifies the email address specified as the destination of the print request email, and determines, based on the identified email address, the corporate user where the image forming apparatus 20 to be used for printing is installed. The email receiving unit 11 refers to the address information storage unit 18 to determine the corporate user.

FIG. 14 is a table illustrating an exemplary configuration of the address information storage unit 18. As illustrated by FIG. 14, the address information storage unit 18 stores a company code and a reception address for each corporate user.

The company code is identification information assigned to each corporate user. The reception address is an email address of the management server 10 assigned to the corporate user. From the view point of the management server 10, the reception address is an email address (or a part of an email address) used to receive a print request email sent from the corporate user. In other words, the reception address is a destination email address specified in the pint request email.

The email receiving unit 11 stores a company code corresponding to the destination email address of the print request email in, for example, the memory 103.

In the print information generation process at step S106, the print information generating unit 14 generates print information that additionally includes the company code stored in the memory 103. Accordingly, at step S109, the print information including the company code is sent to the storage server 60. When receiving the print information, the print information reception unit 61 of the storage server 60 stores the received print information in the print information storage unit 62 (S110).

FIG. 15 is a table illustrating an exemplary configuration of the print information storage unit 62 according to the second embodiment. As illustrated by FIG. 15, the print information storage unit 62 of the second embodiment stores print information that additionally includes a company code for each set of print data. Alternatively, the print information storage unit 62 may be provided for each company code.

Thereafter, the user who has sent the print request email moves to a location where the image forming apparatus 20 is installed, and operates the image forming apparatus 20. Next, an exemplary process performed by the image forming apparatus 20 in response to user operations is described.

A process performed by the image forming apparatus 20 according to the second embodiment is substantially the same as the process described above with reference to FIG. 11, except for some steps. At each of steps S305, S310, and S311, the print information obtaining unit 222 sends, to the storage server 60, a print information list request or a print information request including a company code and a device ID in addition to a user name or a PIN code. The device ID is identification information of the image forming apparatus 20, and is stored, for example, in the ROM 213, the NVRAM 215, or the HDD 214 of the image forming apparatus 20. The company code is identification information of a company (corporate user) where the image forming apparatus 20 is installed. For example, the company code is preset in the image forming apparatus 20 and stored in the NVRAM 215 or the HDD 214.

Alternatively, the device ID may be held by an application installed in the image forming apparatus 20. In this case, the device ID can be used to identify an image forming apparatus 20 where the application is installed. Thus, in the present embodiment, an identifier of an application installed in an image forming apparatus 20 may be used as a device ID for identifying the image forming apparatus 20.

The print information providing unit 63 of the storage server 60 determines whether the combination of the company code and the device ID included in specified information specified in the print information (list) request is stored in the user device information storage unit 64.

FIG. 16 is a table illustrating an exemplary configuration of the user device information storage unit 64. As illustrated by FIG. 16, the user device information storage unit 64 stores, for each image forming apparatus 20 installed in the company of a corporate user, the company code of the corporate user and the device ID of the image forming apparatus 20.

When the combination of the company code and the device ID specified in the print information (list) request are not stored in the user device information storage unit 64, the print information providing unit 63 does not send (a list of) print information to the image forming apparatus 20. This is because the validity of the image forming apparatus 20 sending the print information (list) request cannot be confirmed. In the present embodiment, the image forming apparatus 20 is determined to be valid when the image forming apparatus 20 is installed in the company of an authorized corporate user.

When the combination of the company code and the device ID specified in the print information (list) request is stored in the user device information storage unit 64, the print information providing unit 63 obtains, from the print information storage unit 62 (see FIG. 15), one or more sets of print information corresponding to the company code and the user name or the PIN code specified in the print information (list) request. Thus, according to the second embodiment, the print information providing unit 63 obtains print information that includes, in addition to the user name or the PIN code (request identification number and a data identification number), a company code that is the same as the company code specified in the print information (list) request. The print information providing unit 63 sends (a list of) the obtained sets of print information to the image forming apparatus 20.

When it is not necessary to verify the validity of the image forming apparatus 20, no company code may be specified in the print information (list) request. In this case, the print information providing unit 63 may be configured to identify a company code by referring to the user device information storage unit 64 based on the device ID specified in the print information (list) request, and use the company code to obtain print information from the print information storage unit 62.

According to the second embodiment, as described above, different email addresses of the management server 10 are assigned to corporate users. Also, a company code is identified based on a print information (list) request sent from the image forming apparatus 20, and (a list of) sets of print information including the company code is sent to the image forming apparatus 20. For example, this configuration makes it possible to prevent a problem where print information generated in response to a print request email sent from a user of a company is returned as a print object in response to a print information (list) request sent from another user of another company having the same user name.

When an email address of an authorized user of a company is specified as a sender email address of a print request email, and the correspondence between company codes of companies and email addresses of authorized users of the companies is managed, a company code can be identified based on the sender email address of the print request email. Accordingly, when the printing system is used only by authorized users, it is not necessary to assign email addresses of the management server 10 to respective company users.

However, when a sender email address of a print request email is an email address of a guest user (which is hereafter referred to as a "user X"), there exists no company code corresponding to the email address. Therefore, in this case, it is not possible to identify a company code based on the print request email.

When no company code is identified, print information including no company code is stored in the storage server 60, and no company code is required to obtain print information corresponding to a print information (list) request, the user X can print the print information (print data) in any company. In the second embodiment, to prevent the above problem, different email addresses of the management server 10 are assigned to respective company users, a company code is specified in a print information (list) request, and (a list of) print information including the company code is returned to the image forming apparatus 20.

The email addresses of the management server 10 assigned to the respective corporate users may be used as company codes. In this case, the user device information storage unit 64 may be omitted. Also in this case, the email address assigned to a corporate user is included in the corresponding print information stored in the storage server 60. Also, the email address is stored in advance in the image forming apparatus 20. The image forming apparatus 20 sends a print information (list) request including the device ID and the email address to the storage server 60. The storage server 60 returns (a list of) print information including the email address specified in the print information (list) request.

This configuration also provides advantageous effects as described above.

Next, a third embodiment is described. Below, differences from the first and second embodiments are mainly described. Accordingly, configurations and methods of the third embodiment that are not described below may be substantially the same as those of the first or second embodiment.

The third embodiment is different from the first and second embodiments in the user authentication process performed at the image forming apparatus 20.

In the first embodiment, a user name and a password, or a PIN code is entered via the login screen 510. In this case, the user needs to enter a user name and a password, or a PIN code using, for example, a software keyboard. In the third embodiment, to reduce the workload of the user, the image forming apparatus 20 includes a non-contact card reader. The user uses a portable user terminal 30 including an IC chip similar to that of an IC card. A storage unit of the user terminal 30 stores, for example, a user name and a password. The user terminal 30 also includes an application that reads the user name and the password from the storage unit and sends them via the card reader to the image forming apparatus 20 when the user terminal 30 is held over the card reader. The authentication control unit 221 of the image forming apparatus 20 performs an authentication process using the user name and the password received via the card reader.

The above configuration enables an authorized user to be authenticated by just holding the user terminal 30 over the image forming apparatus 20.

When a print request email is sent from the user terminal 30 being used by a guest user, a response email including PIN codes is returned to the user terminal 30 and stored in a storage unit of the user terminal 30. In this case, when the user terminal 30 is held over the card reader of the image forming apparatus 20, the application of the user terminal 30 searches the user terminal 30 for an email where a predetermined email address is specified as the sender email address. When such an email is found, the application sends PIN codes in the found email via the card reader to the image forming apparatus 20. The image forming apparatus 20 displays the PIN codes to allow the user to select one of the PIN codes. The print information obtaining unit 222 obtains print information corresponding to the selected PIN code.

With the above configuration, a guest user can request the image forming apparatus 20 to execute a print job based on print information corresponding to a PIN code by holding the user terminal 30 over the card reader of the image forming apparatus 20.

The above embodiments are described using a printing system including the image forming apparatus 20 for printing print data. However, the present invention may also be applied to a system including a different type of output device such as a projector for projecting image data or a display device for displaying image data. In this case, print object data is replaced with output object data to be output from a projector or a display device.

Also in the above embodiments, an email is used to send print object data. However, any communication means other than email may be used to send print object data to the management server 10. In this case, the management server 10 receives print object data, or print object data and a user name from the user terminal 30. When the user name is not stored in the user information storage unit 52 or when no user name is received, the management server 10 generates PIN codes and sends the PIN codes to the user terminal 30.

When company codes are used as in the second embodiment, the management server 10 receives a company code in addition to print object data, or print object data and a user name from the user terminal 30. When no company code is received or the received company code is not stored in the management server 10, the management server 10 sends, to the user terminal 30, a message indicating that printing of print object data is not allowed. When the company code is stored in the management server 10, but the user name is not stored in the user information storage unit 52 or no user name is received, the management server 10 generates PIN codes and sends the PIN codes to the user terminal 30.

In the above embodiments, the management server 10 and the storage server 60 may be implemented by one computer. Also, the management server 10, the storage server 60, and the authentication server 50 may be implemented by one computer. Further, the functions of the management server 10, the storage server 60, and the authentication server 50 may be provided by the image forming apparatus 20.

Conversely, each of the management server 10, the storage server 60, and the authentication server 50 may be implemented by multiple computers.

In the above embodiments, print data is generated by the management server 10. However, print data of electronic data attached to a print request email may be generated any one of the user terminal 30, the management server 10, the storage server 60, and the image forming apparatus 20.

Next, a fourth embodiment, which is a variation of the second embodiment, is described.

Figure 17:
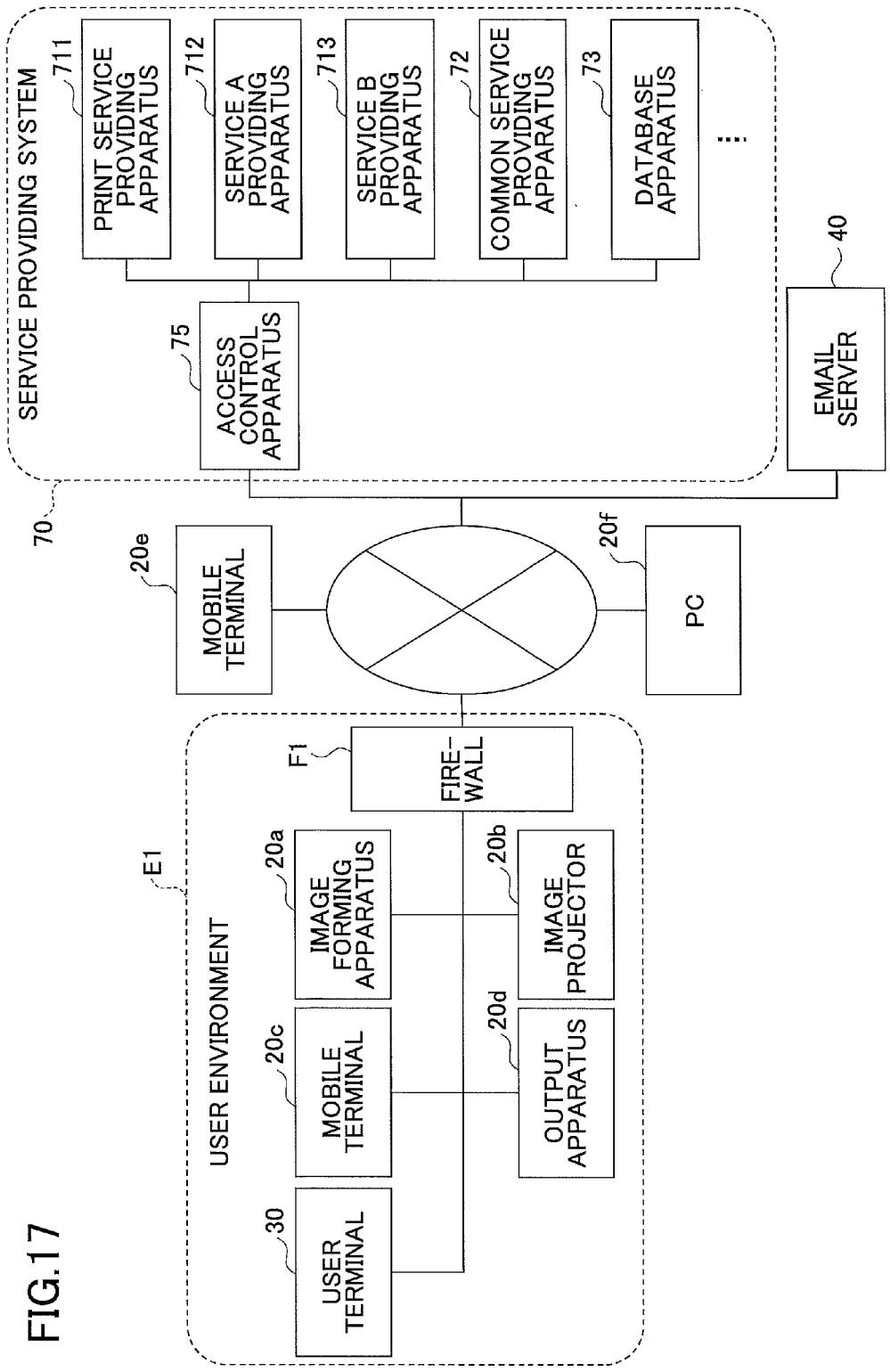
FIG. 17 is a drawing illustrating an exemplary configuration of a system according to a fourth embodiment.

FIG. 17 is a drawing illustrating an exemplary configuration of a system according to the fourth embodiment. The same reference numbers as those used in FIG. 1 are assigned to the corresponding components in FIG. 17, and descriptions of those components are omitted here. In FIG. 17, a service providing system 70 and a user environment E1 are connected to each other via a wide area network such as the Internet to enable communications between them.

The service providing system 70 is a computer system that provides a cloud service via a network. Although a cloud service is used as an example in the present embodiment, the present embodiment may also be applied to any other type of service provided via a network such as a service provided by an application service provider (ASP) or a Web service.

The service providing system 70 may include an access control apparatus 75, a print service providing apparatus 711, a service A providing apparatus 712, a service B providing apparatus 713, a common service providing apparatus 72, and a database apparatus 73. These apparatuses may be implemented by separate computers or by one computer.

The access control apparatus 75 controls access from the outside to the computers in the service providing system 70 and controls distribution of loads among the computers.

The print service providing apparatus 711 indicates one or more computers for controlling a process to provide a cloud print service. In the cloud print service, print data is uploaded into a cloud environment (in the present embodiment, the service providing system 70) so that the uploaded print data can be printed using an image forming apparatus 20a when necessary.

The service A providing apparatus 712 and the service B providing apparatus 713 are examples of computers that provide services other than the cloud print service.

The common service providing apparatus 72 is implemented by one or more computers and includes functions that are common to apparatuses (e.g., the print service providing apparatus 711, the service A providing apparatus 712, and the service B providing apparatus 713) that directly provide specific services via a network, or functions called from multiple apparatuses.

The database apparatus 73 is implemented by one or more computers or storage devices and functions as various storage units.

The user environment E1 is a system environment in an organization such as a company that is a user of the service providing system 70. As illustrated by FIG. 17, the user environment E1 includes an image forming apparatus 20a, an image projector 20b, a mobile terminal 20c, an output apparatus 20d, and a user terminal 30. The apparatuses in the user environment E1 are connected to each other via a network (either wired or wireless) such as a local area network (LAN).

The image forming apparatus 20a corresponds to the image forming apparatus 20 of the second embodiment.

The image projector 20b projects image data. The mobile terminal 20c may be, for example, a personal digital assistant (PDA), a tablet terminal, a smartphone, or a cell phone. The output apparatus 20d is any other type of output apparatus.

The user environment E1 may also include a firewall F1. The firewall F1 may be implemented by a known firewall. The firewall 1, for example, blocks requests from the outside of the user environment E1.

The service providing system 70 may also be accessible from an environment other than the user environment E1. For example, it is possible to access the service providing system 70 via the Internet from a mobile terminal 20e and a PC 20f. The mobile terminal 20e and the PC 20f may be included in the user environment E1.

Figure 18:
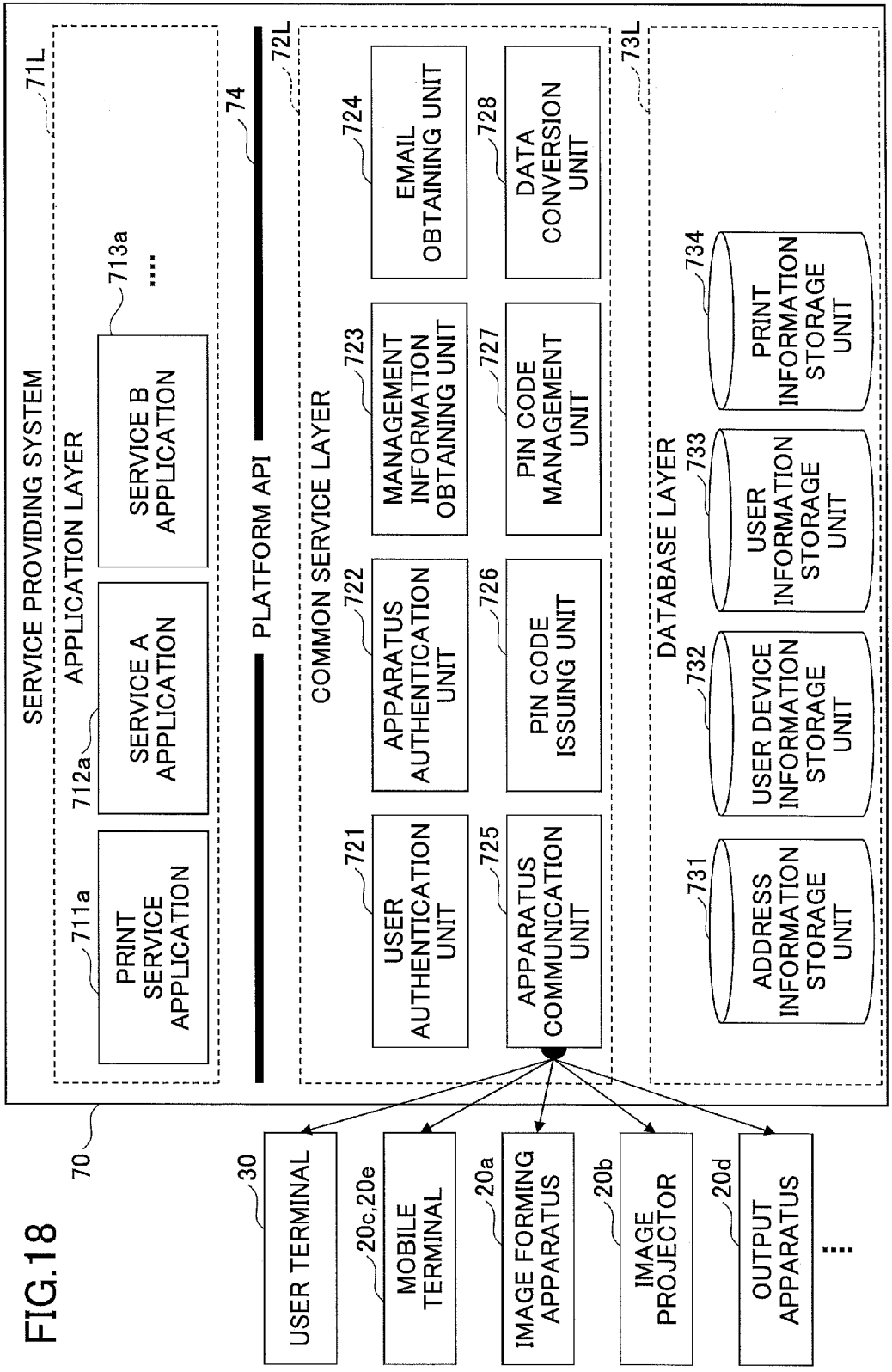
FIG. 18 is a drawing illustrating an exemplary functional configuration of a service providing system according to the fourth embodiment.

FIG. 18 is a drawing illustrating an exemplary functional configuration of the service providing system 70 according to the fourth embodiment. As illustrated by FIG. 18, functions of the service providing system 70 may be classified into an application layer 71L, a common service layer 72L, and a database layer 73L.

The application layer 71L includes server applications that collaborate with apparatuses such as the image forming apparatus 20a. In the example of FIG. 18, the application layer 71L includes server applications such as a print service application 711a, a service A application 712a, and a service B application 713a.

The print service application 711a is a server application related to the cloud print service. In the present embodiment, the print service application 711a is installed in the print service providing apparatus 711. The service A application 712a and the service B application 713a are examples of other server applications. In the present embodiment, the service A application 712a and the service B application 713a are installed in the service A providing apparatus 712 and the service B providing apparatus 713, respectively.

The common service layer 72L includes functions that are common to multiple server applications or basic functions called from multiple server applications, and is provided in the common service providing apparatus 72. The functions of the common service layer 72L can be called via a platform application programming interface (API) 74. The platform AIP 74 is called, basically, from the server applications in the application layer 71L. The platform API 74 may be made public to third vendors other than the operator company of the service providing system 70. In this case, server applications may be provided by third vendors. Thus, server applications may be developed using the platform API 74 and added to the service providing system 70.

In the example of FIG. 18, the common service layer 72L includes a user authentication unit 721, an apparatus authentication unit 722, a management information obtaining unit 723, an email obtaining unit 724, an apparatus communication unit 725, a PIN code issuing unit 726, a PIN code management unit 727, and a data conversion unit 728.

The user authentication unit 721 performs user authentication. The apparatus authentication unit 722 performs authentication based on the relationship between the image forming apparatus 20a, a user, and an organization. An organization indicates, for example, a company in the above embodiments and any other type of group. In the fourth embodiment, identification information corresponding to a company code in the second embodiment is referred to as an "organization code". The authentication based on the relationship between the image forming apparatus 20a, a user, and an organization includes a process of determining whether the user and the image forming apparatus 20a belong to the organization.

The management information obtaining unit 723, for example, obtains information stored in the database layer 73L in response to a request from the application layer 71L. The email obtaining unit 724 obtains (or receives) emails stored in the email server 40 according to a protocol such as the Post Office Protocol (POP). The apparatus communication unit 725 communicates with various apparatuses. The PIN code issuing unit 726 issues (or generates) PIN codes. The PIN code management unit 727 manages the correspondence between request identification numbers of PIN codes and organization codes. The data conversion unit 728 converts formats of data. In the present embodiment, the data conversion unit 728 generates print data based on print object data.

The server applications in the application layer 71L and the units in the common service layer 72L are implemented, for example, by executing one or more programs installed in the computers constituting the service providing system 70 by processors of the computers.

The database layer 73L includes databases (storage units) storing various types of information, and is implemented by the database apparatus 73. In the example of FIG. 18, the database layer 73L includes an address information storage unit 731, a user device information storage unit 732, a user information storage unit 733, and a print information storage unit 734.

The address information storage unit 731 has a configuration that is substantially the same as the configuration of the address information storage unit 18 (see FIG. 14). The user device information storage unit 732 has a configuration that is substantially the same as the configuration of the user device information storage unit 64 (see FIG. 16). The user information storage unit 733 has a configuration that is similar to but is slightly different from the configuration of the user information storage unit 52 (see FIG. 6). The difference between the user information storage unit 733 and the user information storage unit 52 is described later. The print information storage unit 734 has a configuration that is substantially the same as the configuration of the print information storage unit 62 (see FIG. 7).

The classification of and the hierarchical relationship among the software components (or functional units) and the storage units of the service providing system 70 illustrated by FIG. 18 are just examples, and such classification and a hierarchical relationship are not essential to implement the present embodiment. That is, as long as the service providing system 70 can perform processes as described in the present embodiment, the classification of and the hierarchical relationship among the software components and the storage units of the service providing system 70 may be determined freely.

Figure 19:
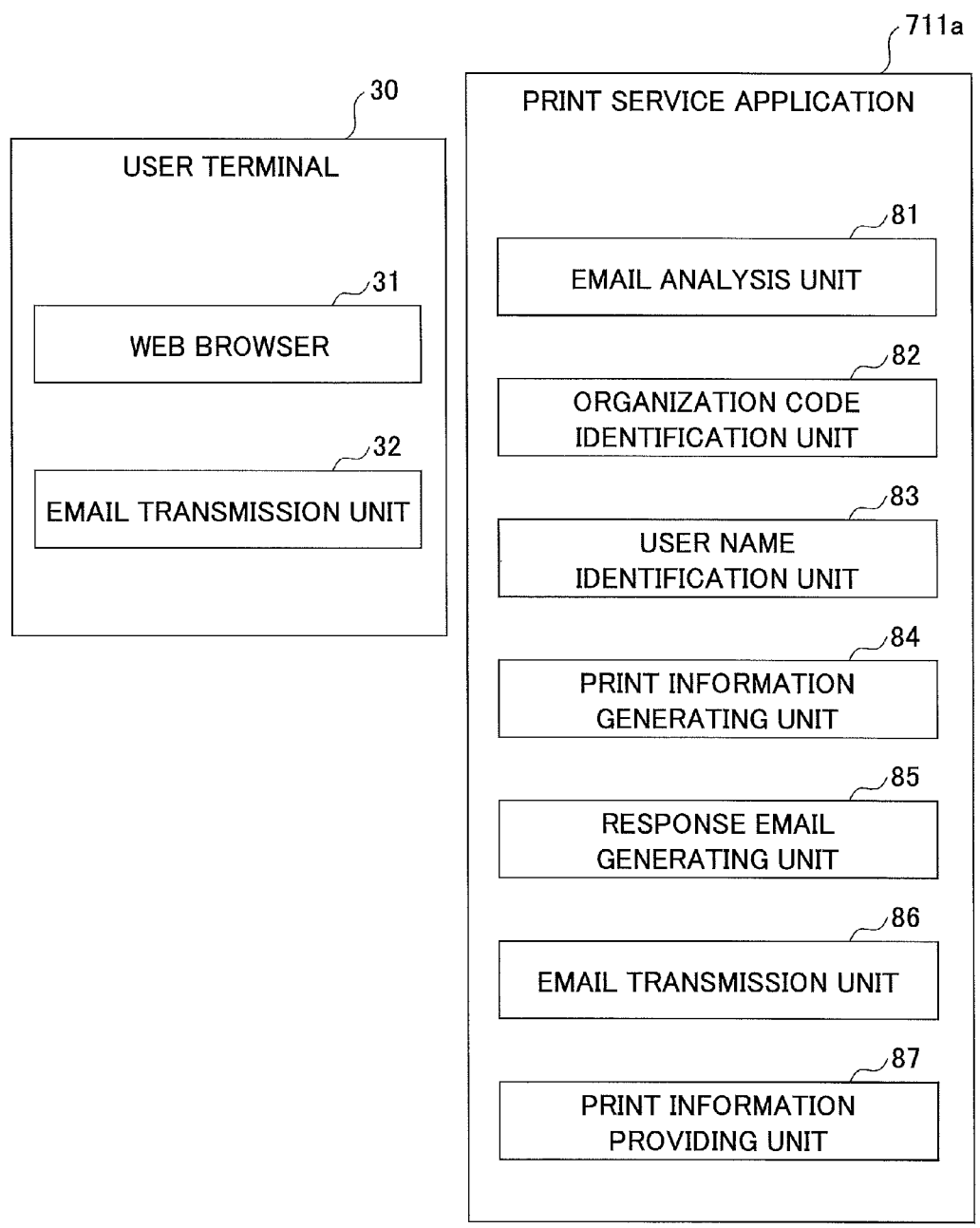
FIG. 19 is a drawing illustrating exemplary functional configurations of a user terminal and a print service application according to the fourth embodiment.

FIG. 19 is a drawing illustrating exemplary functional configurations of the user terminal 30 and the print service application 711a according to the fourth embodiment.

As illustrated by FIG. 19, the user terminal 30 may include a Web browser 31 and an email transmission unit 32. The Web browser 31 may be implemented by any known Web browser. The email transmission unit 32 sends emails. In the present embodiment, the email transmission unit 32 sends print request emails. The email transmission unit 32 may be implemented by executing a program called a mailer by the user terminal 30.

As illustrated by FIG. 19, the print service application 711a may include an email analysis unit 81, an organization code identification unit 82, a user name identification unit 83, a print information generating unit 84, a response email generating unit 85, an email transmission unit 86, and a print information providing unit 87.

The email analysis unit 81 analyzes a print request email to extract information such as print object data from the print request email. The organization code identification unit 82 identifies an organization code corresponding to a destination email address of a print request email. The user name identification unit 83 identifies a user name corresponding to a sender (source) email address of a print request email. The functions of the print information generating unit 84, the response email generating unit 85, the email transmission unit 86, and the print information providing unit 87 are substantially the same as the functions of the print information generating unit 14, the response email generating unit 15, the email transmission unit 16, and the print information providing unit 63 of FIG. 13.

An exemplary process according to the fourth embodiment is described below with reference to FIG. 20.

Figure 20:
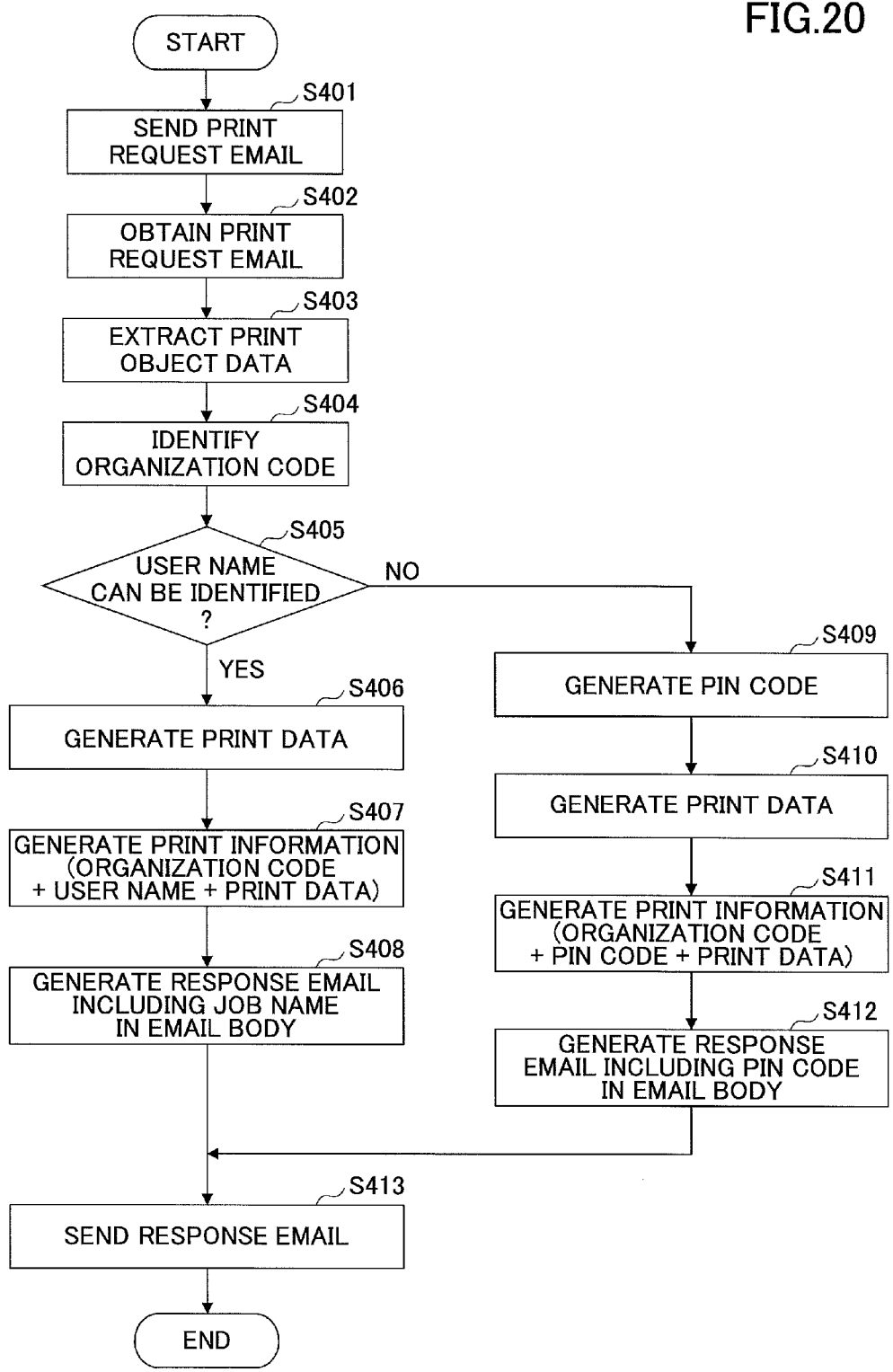
FIG. 20 is a flowchart illustrating an exemplary print information registration process using a print request email.

FIG. 20 is a flowchart illustrating an exemplary print information registration process.

At step S401, in response to an instruction from the user, the email transmission unit 32 of the user terminal 30 sends a print request email to an email address assigned to an organization to which the user belongs. Contents of the print request email are substantially the same as those described in the above embodiments.

Next, the email obtaining unit 724 of the service providing system 70 obtains the print request email from the email server 40 (S402). Next, the email analysis unit 81 of the print service application 711a extracts print object data from the print request email (S403). Next, the organization code identification unit 82 of the print service application 711a identifies an organization code for the print request email by referring to the address information storage unit 731 based on a destination email address of the print request email (S404). That is, the organization code identification unit 82 obtains an organization code stored in the address information storage unit 731 in association with the destination email address. The address information storage unit 731 of the fourth embodiment may have a configuration that is substantially the same as the configuration of the address information storage unit 18 (see FIG. 14), except that "company code" in the address information storage unit 18 is replaced with "organization code".

Next, the user name identification unit 83 of the print service application 711a determines whether a user name is identifiable based on a sender email address of the print request email (S405). More specifically, the user name identification unit 83 determines whether the sender email address is stored in the user information storage unit 733 in association with the organization code (which is hereafter referred to as a "target organization code") identified at step S404.

FIG. 21 is a table illustrating an exemplary configuration of the user information storage unit 733 according to the fourth embodiment. As illustrated by FIG. 21, the user information storage unit 733 stores user information that includes an organization code and a role in addition to information items of user information stored in the user information storage unit 52 (see FIG. 6).

The role is information indicating whether a user is an administrator or an end user ("user" in FIG. 21). The administrator is a person who manages apparatuses such as the image forming apparatus 20a that collaborate with the service providing system 70. For example, the administrator performs operations to enable the image forming apparatus 20a to collaborate with the service providing system 70. The end user ("user") uses services provided by the service providing system 70.

At step S405, the user name identification unit 83 determines whether user information including the organization code and the sender email address exists in the user information storage unit 733. When such user information exists, a user name (which is hereafter referred to as a "target user name") in the user information is identified.

When a target user name is identified (YES at S405), the data conversion unit 728 of the service providing system 70 generates print data for the print object data (S406). When the print object data is in a format that can be printed without conversion, step S406 may be omitted.

Next, the print information generating unit 84 generates print information (S407). The print information includes a job name, the target organization code, the target user name, and the print data. The print information generating unit 84 stores the generated print information in the print information storage unit 734.

Next, the response email generating unit 85 of the print service application 711a generates a response email (S408). In this case, the response email includes, for example, the job name. The email transmission unit 86 sends the response email to the sender email address of the print request email (S413).

On the other hand, when no user name is identified at step S405 (NO at S405), the PIN code issuing unit 726 of the service providing system 70 generates a PIN code (S409). Step S409 may be substantially the same as step S206 of FIG. 8. Steps S410 through S412 are substantially the same as steps S406 through S408. However, print information generated at step S411 includes the job name, the organization code, the PIN code (a data identification number and a request identification number), the print data, and a date and time. Also, at step S412, a response email including the PIN code as illustrated in FIG. 10 and the job name is generated.

Next, an exemplary process of registering print information via the Web browser 31 of the user terminal 30 is described. In the fourth embodiment, it is possible to register print information using communication means other than a print request email.

Figure 22:
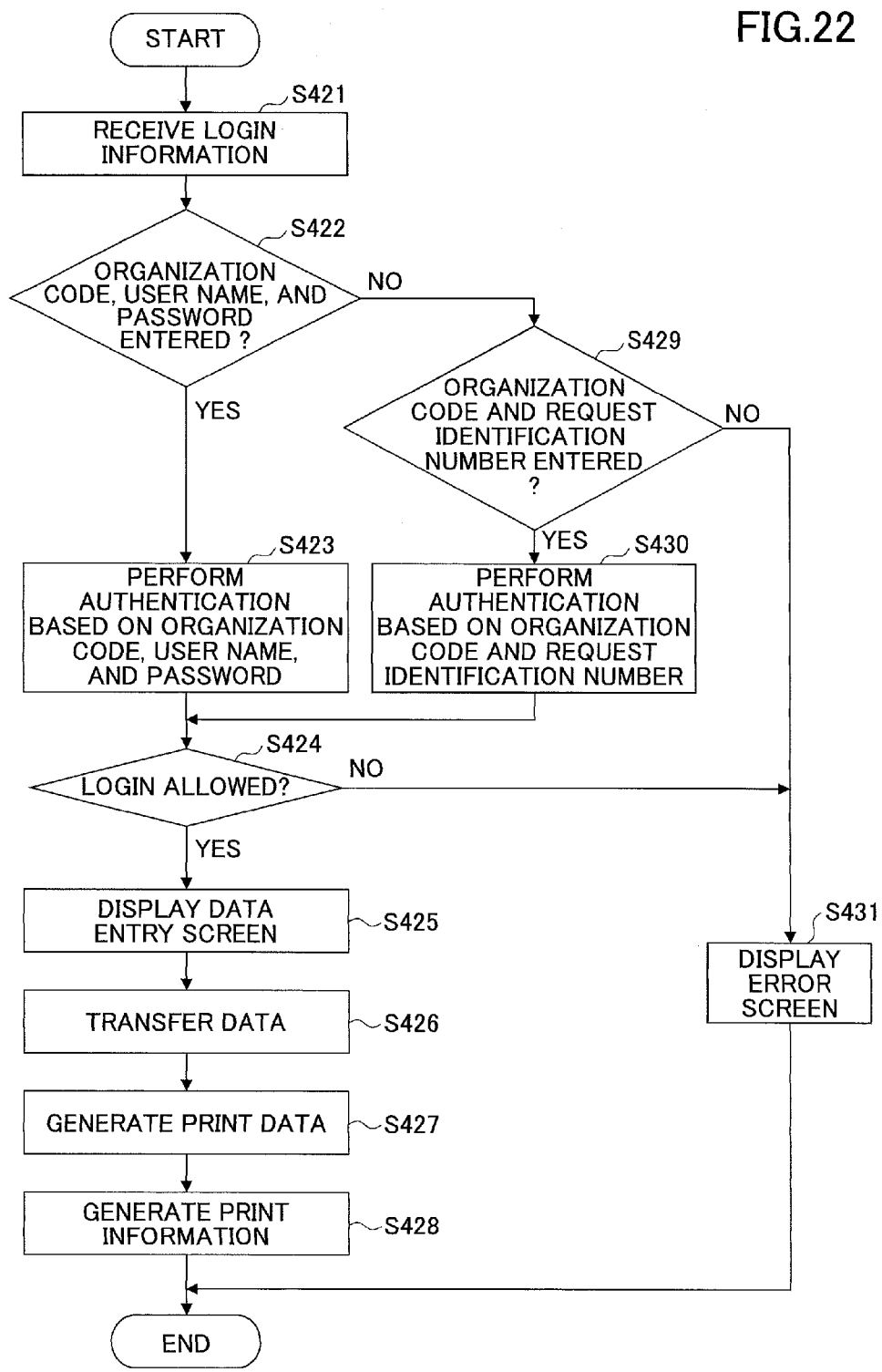
FIG. 22 is a flowchart illustrating an exemplary print information registration process using a Web interface.

FIG. 22 is a flowchart illustrating an exemplary print information registration process using a Web interface. In FIG. 22, it is assumed that a login screen for logging into the service providing system 70 is displayed by the Web browser 31 of the user terminal 30 before step S421 is performed.

At step S421, the Web browser 31 receives login information from a user via the login screen.

Figure 23:
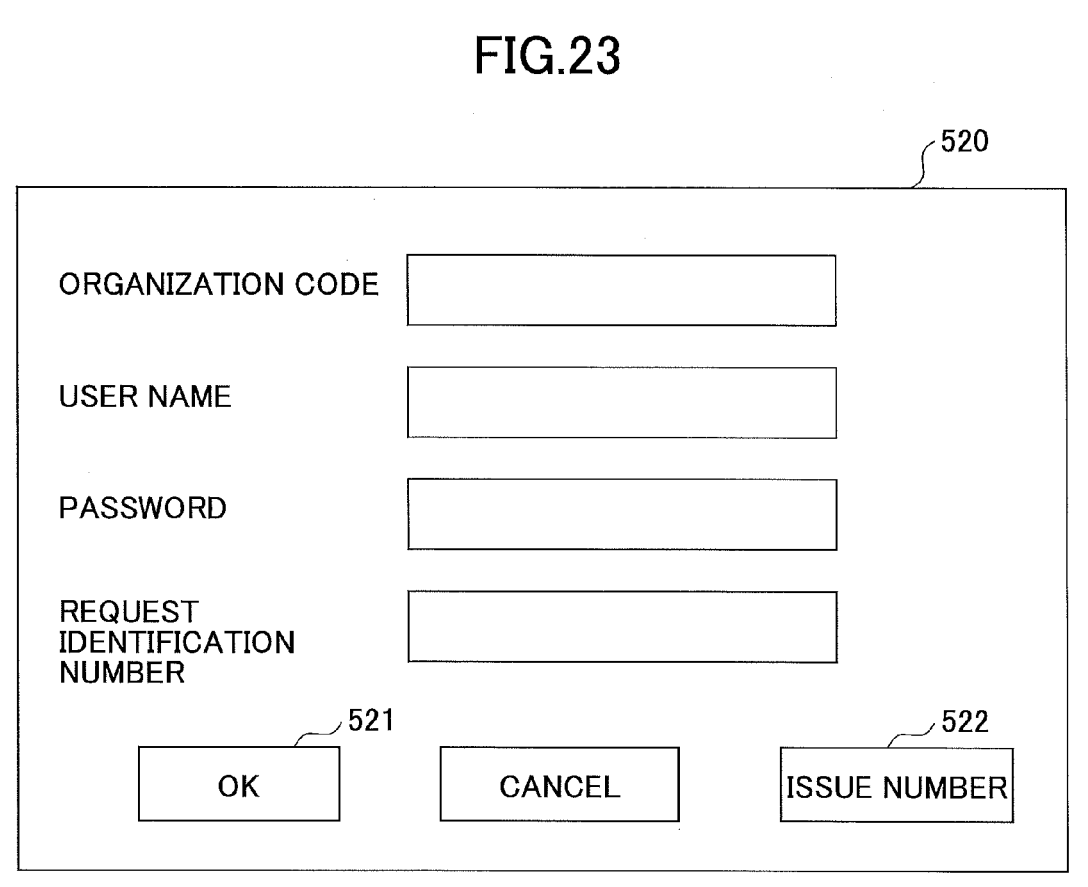

FIG. 23 is a drawing illustrating an exemplary login screen 520 according to the fourth embodiment. As illustrated by FIG. 23, the login screen 520 includes entry fields for entering an organization code, a user name, a password, and a request identification number. The login screen 520 also includes an OK button 521 and an issue number button 522.

A user can log into the service providing system 70 by entering login information in one of two patterns. In a first pattern, an organization code, a user name, and a password are entered on the login screen 520. In a second pattern, an organization code and a request identification number are entered on the login screen 520. In the case of the second pattern, the user needs to obtain a request identification number in advance. When the issue number button 522 is pressed, a request identification number is issued. A process performed when the issue number button 522 is described later.

When the OK button 521 of the login screen 520 is pressed, the Web browser 31 determines whether an organization code, a user name, and a password are entered on the login screen 520 (S422). Here, the Web browser 31 performs processes based on definitions in a Web page (e.g., hypertext markup language (HTML) data) for displaying the login screen 520.

When an organization code, a user name, and a password are entered on the login screen 520 (YES at S422), the Web browser 31 requests the service providing system 70 to perform authentication based on the organization code, the user name, and the password (S423). That is, the Web browser 31 sends the organization code, the user name, and the password to the user authentication unit 721. The user authentication unit 721 performs authentication based on whether the combination of the organization code, the user name, and the password is stored in the user information storage unit 733.

When the authentication is successful and login is allowed (YES at S424), the Web browser 31 displays a data entry screen (S425). The data entry screen allows the user to select one or more files to be printed from files stored in the user terminal 30. When files are selected via the data entry screen, the Web browser 31 transfers data stored in the files to the service providing system 70 (S426).

When the data is received at the service providing system 70, steps similar to steps S406 and S407 of FIG. 20 are performed (S427, S428). As a result, print information including print data generated based on the received data is stored in the print information storage unit 734.

On the other hand, when an organization code, a user name, and a password are not entered on the login screen 520 (NO at S422), the Web browser 31 determines whether an organization code and a request identification number are entered (S429). When an organization code and a request identification number are entered (YES at S429), the Web browser 31 requests the service providing system 70 to perform authentication based on the organization code and the request identification number (S430). The user authentication unit 721 performs authentication based on whether the combination of the organization code and the request identification number is registered in the service providing system 70.

When the authentication is successful and login is allowed (YES at S424), the Web browser 31 performs steps S425 through S428. In this case, at step S427, a data identification number is generated for each set of print data generated based on the transferred data. Also in this case, a process similar to step S411 of FIG. 20 is performed at step S428. As a result, print information including the organization code, the request identification number, and the data identification number is stored in the print information storage unit 734.

When the login information is entered on the login screen 520 in neither the first nor the second pattern (NO at S429) or the login has failed (NO at S424), the Web browser 31 displays an error screen (S431). In this case, print information is not registered.

Next, a process of issuing a PIN code via a Web interface is described below. The process is performed before authentication based on an organization code is performed.

Figure 24:
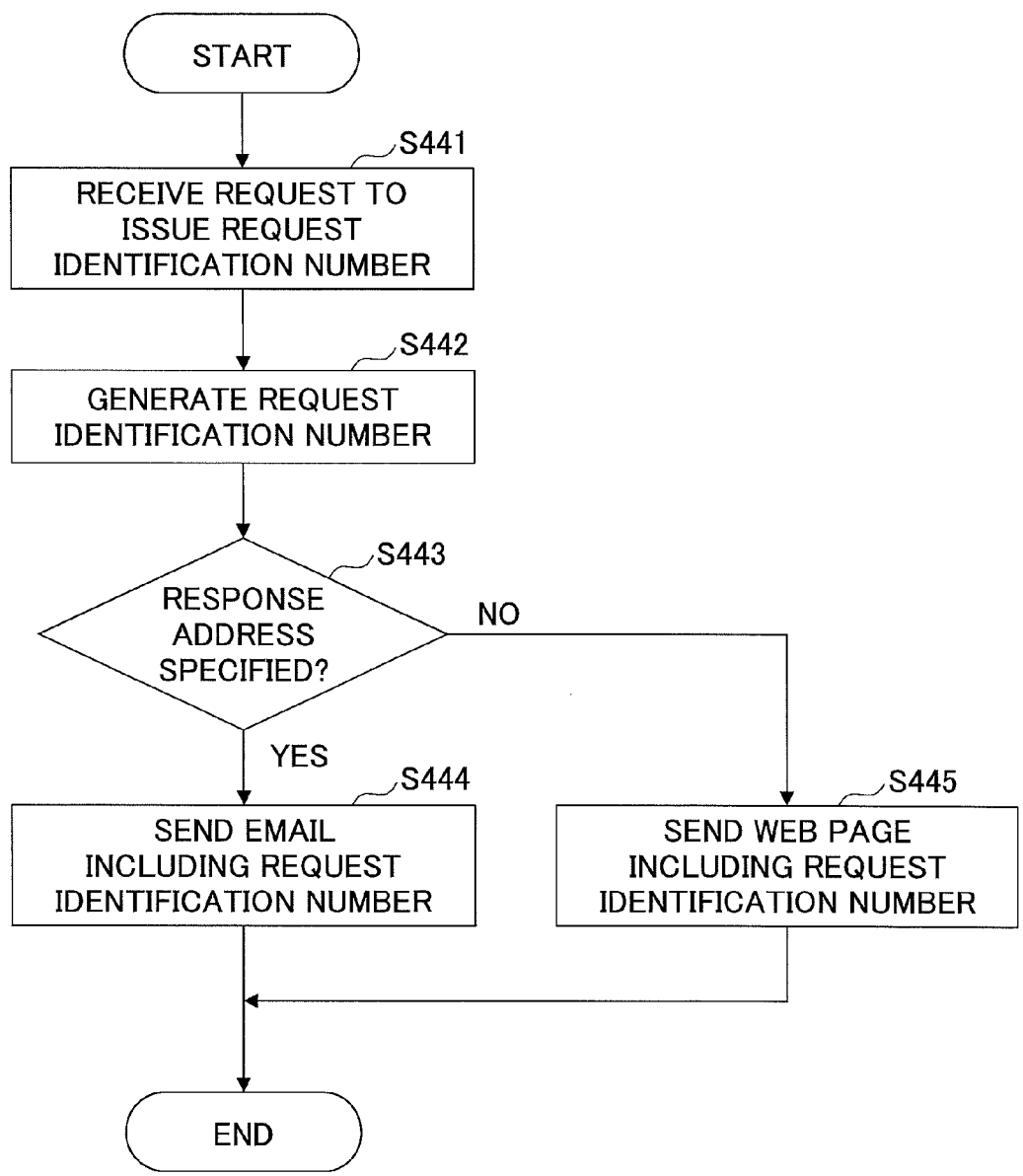
FIG. 24 is a flowchart illustrating an exemplary request identification number issuing process using a Web interface.

FIG. 24 is a flowchart illustrating an exemplary request identification number issuing process using a Web interface. In FIG. 24, it is assumed that the login screen 520 (see FIG. 23) is displayed by the Web browser 31 of the user terminal 30 before step S441 is performed.

At step S441, the Web browser 31 receives a request to issue a request identification number. The Web browser 31 receives the request to issue a request identification number when the issue number button 522 is pressed after an organization code is entered on the login screen 520. The Web browser 31 may be configured to display a response address specification screen as illustrated by FIG. 25 when the issue number button 522 is pressed.

Figures 25, 26:
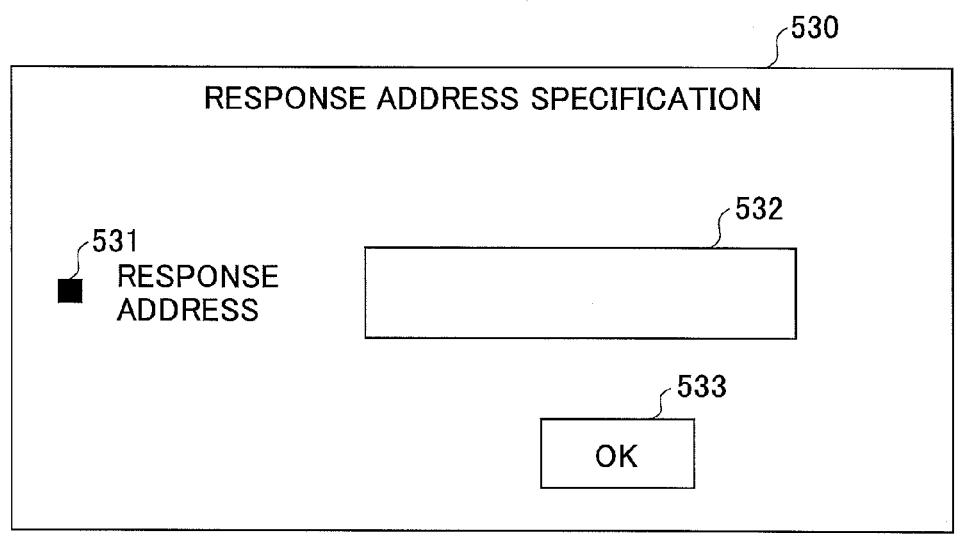
FIG. 25 is a drawing illustrating an exemplary response address specification screen.
FIG. 26 is a table illustrating an exemplary configuration of a request identification number management table.

FIG. 25 is a drawing illustrating an exemplary response address specification screen 530. As illustrated by FIG. 25, the response address specification screen 530 includes a check button 531, an address input field 532, and an OK button 533.

The address input field 532 is used to enter an email address (which is hereafter referred to as a "response address") to be specified as a destination of an email including a request identification number to be issued. The check button 531 is used to select whether to receive a request identification number via an email. When the check button 531 is selected, an email address can be entered in the address input field 532.

When the OK button 533 is pressed, the Web browser 31 sends a request identification number issuance request including the organization code entered on the login screen 520 to the service providing system 70. When a response address is entered on the response address specification screen 530, the request identification number issuance request also includes the response address.

Next, the PIN code issuing unit 726 of the service providing system 70 generates a request identification number (S442). The generated request identification number is managed by the PIN code management unit 727 in association with the organization code included in the request identification number issuance request. For example, the PIN code management unit 727 manages the correspondence between organization codes and request identification numbers using a request identification number management table as illustrated by FIG. 26.

FIG. 26 is a table illustrating an exemplary configuration of the request identification number management table. The request identification number management table stores request identification numbers generated by the PIN code issuing unit 726 in association with organization codes. The request identification number management table may be implemented by, for example, a memory or a secondary storage of a computer including the PIN code management unit 727. Multiple request identification numbers, which are different from each other, may be associated with one organization code. This is because request identification numbers may be issued for multiple users belonging to the same organization (or company).

The PIN code management unit 727 performs different steps depending on whether a response address is specified in the request identification number issuance request (S443). When a response address is specified (YES at S443), the PIN code management unit 727 sends an email including the generated request identification number to the response address (S444). When no response address is specified (NO at S443), the PIN code management unit 727 sends a response including a Web page for displaying the generated request identification number to the Web browser 31 (S445).

In either case, the user can obtain the request identification number. With the obtained request identification number, the user enters login information in the second pattern described above with reference to FIG. 22.

An exemplary process of registering print information and issuing a PIN code using a print request email is described in more detail with reference to FIG. 27.

Figure 27:
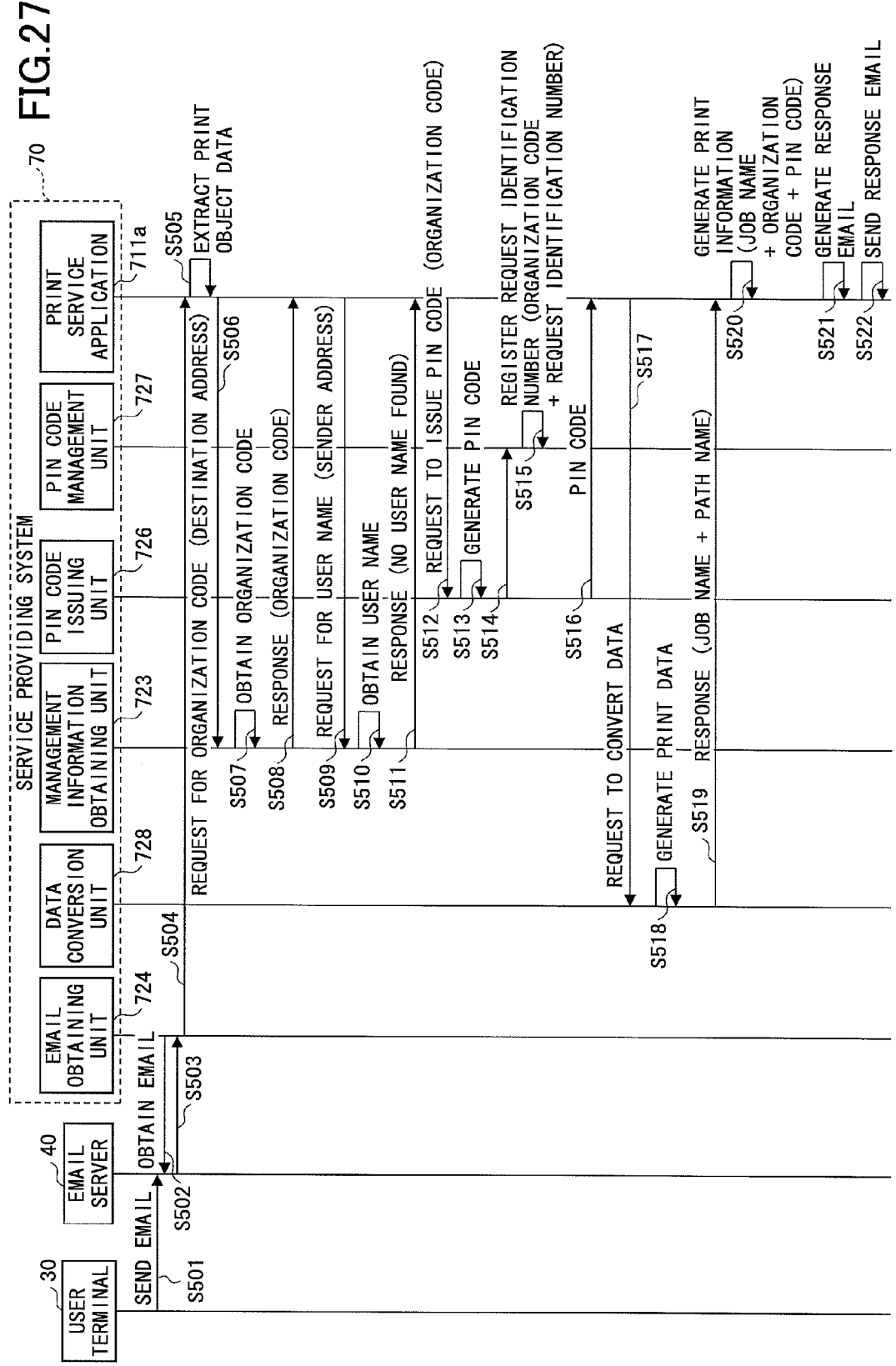
FIG. 27 is a sequence chart illustrating an exemplary process of registering print information and issuing a PIN code using a print request email.

FIG. 27 is a sequence chart illustrating an exemplary process of registering print information and issuing a PIN code using a print request email. The process of FIG. 27 corresponds to a process performed when no user name is identified at step S405 of FIG. 20.

At step S501, the email transmission unit 32 of the user terminal 30 sends a print request email to an email address assigned to an organization to which the user belongs. The print request email is transferred to the email server 40 according to, for example, the Simple Mail Transfer Protocol (SMTP).

The email obtaining unit 724 of the service providing system 70 obtains the print request email stored in the email server 40 according to, for example, the Post Office Protocol (POP) (S502, S503). Next, the email obtaining unit 724 transfers the print request email to the print service application 711a (S504). The email analysis unit 81 of the print service application 711a extracts print object data from the print request email (S505).

The organization code identification unit 82 of the print service application 711a requests the management information obtaining unit 723 to obtain an organization code corresponding to the destination email address of the print request email (S506). The management information obtaining unit 723 obtains an organization code stored in the address information storage unit 731 (see FIG. 14) in association with the destination email address (S507), and sends the organization code (which is hereafter referred to as a "target organization code") to the organization code identification unit 82 (S508).

The user name identification unit 83 of the print service application 711a requests the management information obtaining unit 723 to obtain a user name corresponding to the sender email address of the print request email (S509). The management information obtaining unit 723 attempts to obtain a user name stored in the user information storage unit 733 (see FIG. 21) in association with the sender email address (S510). Here, it is assumed that no user name is obtained. Accordingly, the management information obtaining unit 723 sends a response indicating that no user name has been found to the user name identification unit 83 (S511).

Because no user name has been identified, the user name identification unit 83 sends a PIN code issuance request including the target organization code to request the PIN code issuing unit 726 to issue a PIN codes for each of the email body and one or more sets of attached data of the print request email (S512). The PIN code issuance request may also include information indicating the number of sets of attached data or identification information of each set of attached data. The PIN code issuing unit 726 generates, for the email body and sets of attached data of the print request email, PIN codes including the same request identification number and different data identification numbers (S513), and sends the request identification number and the target organization code to the PIN code management unit 727 (S514). The PIN code management unit 727 registers the target organization code and the request identification number in association with each other in the request identification number management table (see FIG. 26) (S515). Also, the PIN code issuing unit 726 sends a response including the generated PIN codes to the user name identification unit 83 (S516).

Next, the print information generating unit 84 requests the data conversion unit 728 to convert the print target data (including the email body and one or more sets of attached data) into print data (S517). The data conversion unit 728 generates one or more sets of print data based on the print target data, and stores the generated print data in a secondary storage (S518). The data conversion unit 728 assigns identification information (data ID) to each set of generated print data. In the fourth embodiment, the data ID is used as a job name. Then, the data conversion unit 728 sends, to the print information generating unit 84, a response including job names and path names of files where the sets of print data are stored (S519).

The print information generating unit 84 generates, for each set of print data, print information that includes the job name, the target organization code, the data identification number, the request identification number, the path name of the file storing the print data, and the date and time (S520). In this case, the user mode "G" is specified in the print information.

Next, the response email generating unit 85 of the print service application 711a generates a response email including the job names and the PIN codes (S521). The email transmission unit 86 sends the response email to the sender email address of the print request email (S522).

Figure 28:
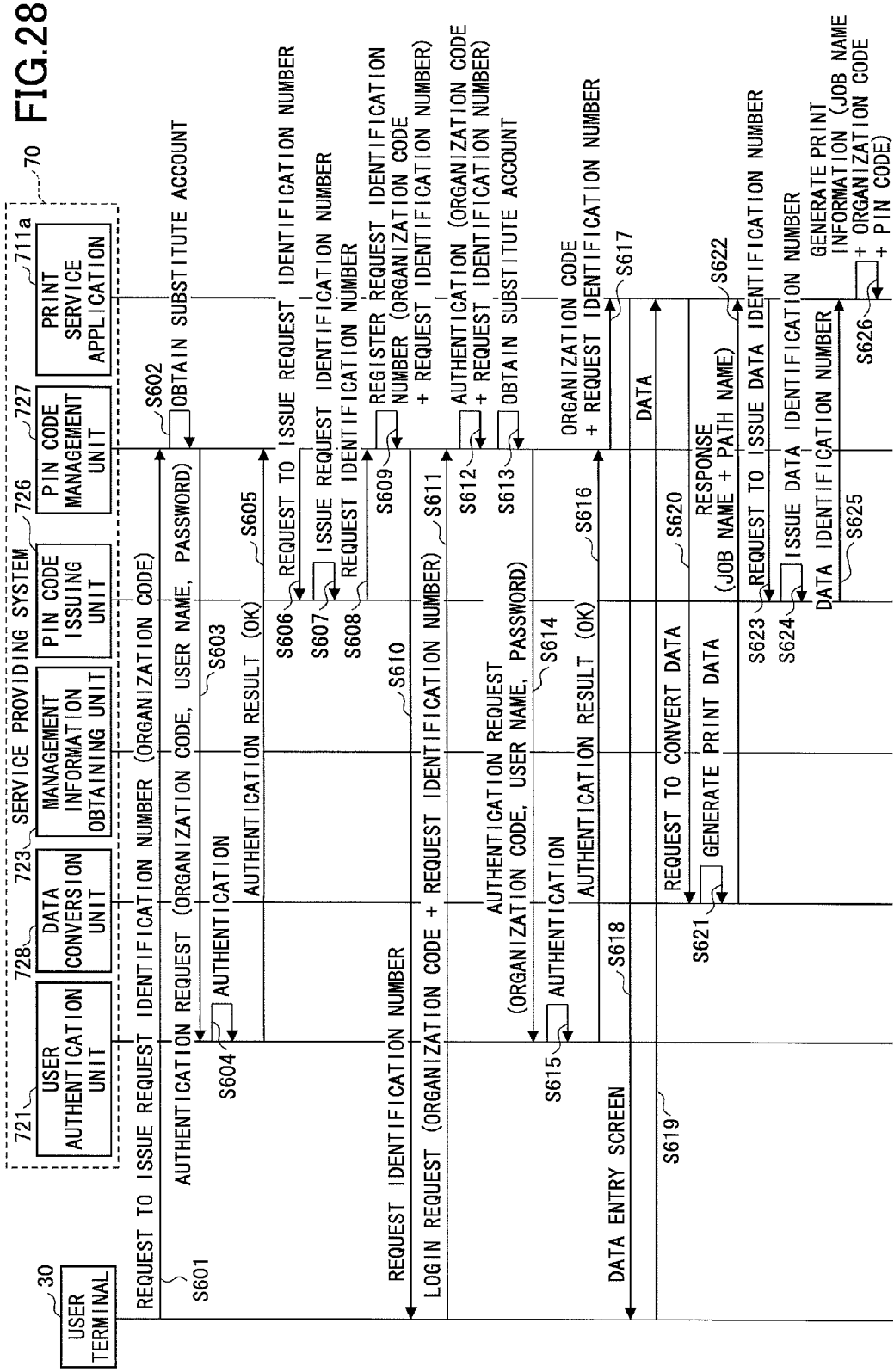
FIG. 28 is a sequence chart illustrating an exemplary process of issuing a request identification number and registering print information using a Web interface.

FIG. 28 is a sequence chart illustrating an exemplary process of issuing a request identification number and registering print information using a Web interface. FIG. 28 illustrates a case where a request identification number is issued as illustrated by FIG. 24, and print information is registered after a login process is performed based on an organization code and the request identification number as illustrated by FIG. 22.

At step S601, in response to entry of information on the login screen 520 and the response address specification screen 530, the Web browser 31 of the user terminal 30 sends a request identification number issuance request including an organization code to the service providing system 70.

In response to the request identification number issuance request, the PIN code management unit 727 obtains a substitute account from a substitute account management table (S602). A substitute account is an account used in place of an authentic account (a user name and a password) assigned to a user. A user (typically a guest user) who requests issuance of a request identification number does not normally have an account. Therefore, such a user cannot be authenticated by the user authentication unit 721 and cannot log into the service providing system 70. A substitute account is used for such a user who does not have an account.

FIG. 29 is a table illustrating an exemplary configuration of the substitute account management table. As illustrated by FIG. 29, combinations of user names and passwords used as substitute accounts are registered in the substitute account management table in association with organization codes. Accordingly, a user name and a password corresponding to the organization code specified in the request identification number issuance request are obtained at step S602.

Alternatively, a user name and a password of an administrator of each organization may be used as a substitute account.

The PIN code management unit 727 sends an authentication request including the user name and the password of the substitute account and the organization code to the user authentication unit 721 (S603). The user authentication unit 721 performs authentication by referring to the user information storage unit 733 based on the organization code, the user name, and the password (S604). Next, the user authentication unit 721 sends the authentication result to the PIN code management unit 727 (S605).

When the authentication is successful, the PIN code management unit 727 requests the PIN code issuing unit 726 to issue a request identification number (S606). The PIN code issuing unit 726 generates a request identification number (S607), and sends the generated request identification number to the PIN code management unit 727 (S608). The PIN code management unit 727 registers the target organization code and the request identification number in association with each other in the request identification number management table (see FIG. 26) (S609). Then, the PIN code management unit 727 sends a response including the request identification number to, for example, the user terminal 30 (S610). The response may be sent via an email or a Web page. When an email is used, an email including the request identification number is sent to a response address specified in the request identification number issuance request. In this case, the email can also be received by a terminal other than the user terminal 30.

The user can log into the service providing system 70 using the request identification number. The user enters the organization code and the request identification number on the login screen 520 (see FIG. 23) displayed by the Web browser 31, and presses the OK button 521. When the OK button is pressed, the Web browser 31 sends a login request (login request based on the request identification number) including the organization code and the request identification number entered on the login screen 520 to the service providing system 70 (S611). When the request identification number is unique across organizations, only the request identification number may be specified in the login request. In this case, information identified based on the combination of the organization code and the request identification number in the subsequent steps may be identified based only on a PIN code.

The PIN code management unit 727 of the service providing system 70 performs authentication based on the organization code and the request identification number specified in the login request (S612). More specifically, the PIN code management unit 727 determines whether the combination of the organization code and the request identification number is registered in the request identification number management table. When the combination of the organization code and the request identification number is registered in the request identification number management table, the PIN code management unit 727 determines that the authentication is successful. When the combination of the organization code and the request identification number is not registered in the request identification number management table, the PIN code management unit 727 determines that the authentication has failed.

When the authentication based on the request identification number is successful, authentication based on the substitute account is performed in a manner similar to steps S602 through S605 (S613 through S616). When the authentication based on the substitute account is successful, it indicates the login process is successful. The PIN code management unit 727 sends the organization code and the request identification number used for the successful login process to the print service application 711a (S617).

The print service application 711a sends a Web page for displaying a data entry screen as a response to the login request based on the request identification number to the user terminal 30 (S618). The Web browser 31 of the user terminal 30 displays the data entry screen based on the Web page.

When one or more files are selected at the user terminal 30 via the data entry screen, the Web browser 31 sends data stored in the files to the print service application 711a (S619). Then, print data is generated for the data through steps similar to steps S517 through S519 of FIG. 27 (S620 through S622).

Next, the print information generating unit 84 of the print service application 711a requests the PIN code issuing unit 726 to issue a data identification number for each set of generated print data (S623). In response to the request, the PIN code issuing unit 726 generates PIN codes including the request identification number for respective sets of print data (S624). Then, the PIN code issuing unit 726 sends the generated PIN codes to the print information generating unit 84 (S625). The print information generating unit 84 generates, for each set of print data, print information that includes a path name of the print data, a job name of the print data, the organization code, the request identification number, the data identification number of the print data, the date and time, and the user mode "G", and stores the print information in the print information storage unit 734 (S620 through S626).

FIG. 30 is a sequence chart illustrating an exemplary print data output process. FIG. 30 illustrates an exemplary process to request the image forming apparatus 20a to execute a print job based on print data included in print information registered through the process of FIG. 27 or FIG. 28.

In FIG. 30, steps S701 through S710 represent a process performed when a normal login (login based on an organization code, a device ID, a user name, and a password) is requested on the image forming apparatus 20a. On the other hand, steps S801 through S810 represent a process performed when a PIN code login (login based on an organization code, a device ID, and a PIN code) is requested on the image forming apparatus 20a.

When a user name and a password are entered on the login screen 510 (see FIG. 12) displayed on the operations panel 25 of the image forming apparatus 20a and the OK button 511 is pressed, the authentication control unit 221 sends a login request to the service providing system 70 (S701). The login request includes an organization ID, a device ID, the user name, and the password. The organization code and the device ID may be stored in advance in, for example, the HDD 214 of the image forming apparatus 20a. Alternatively, the organization code may be entered via the login screen 510. In this case, the login screen 510 additionally includes an entry field for entering an organization code.

When the login request is received at the service providing system 70, the apparatus authentication unit 722 performs authentication (S702). The apparatus authentication unit 722 determines that the authentication is successful when two conditions described below are satisfied. A first condition requires that the combination of the organization code and the device ID specified in the login request is stored in the user device information storage unit 732 (see FIG. 16). A second condition requires that the combination of the organization code ("target organization code"), the user name ("target user name"), and the password specified in the login request is stored in the user information storage unit 733 (see FIG. 21).

When the authentication is successful, the apparatus authentication unit 722 sends a print information list request including the target organization code and the target user name to the print service application 711a (S703). The print information list request also includes the authentication result of step S702 in addition to the target organization code and the target user name.

The print information providing unit 87 of the print service application 711a obtains a list of sets of print information (print information list) including the target organization code and the target user name from the print information storage unit 734 (S704). The print information obtained at step S704 preferably does not include print data. Next, the print information providing unit 87 sends a login result indicating that the login is successful and the obtained print information list to the image forming apparatus 20a (S705).

The print information obtaining unit 222 of the image forming apparatus 20a displays, on the operations panel 25, a list of, for example, job names included in the print information list (S706). When the user selects at least one job name from the displayed list, the print information obtaining unit 222 sends a print data request including the selected job name to the print service application 711a (S707). When receiving the print data request, the print information providing unit 87 of the print service application 711a obtains print data corresponding to the job name specified in the print data request from the print information storage unit 734 (S708). Next, the print information providing unit 87 sends the obtained print data to the image forming apparatus 20a (S709).

Then, the print control unit 223 of the image forming apparatus 20a controls execution of a print job for the obtained print data (S710). As a result, the print data is printed on a recording medium such as paper, and the recording medium is output from the image forming apparatus 20a.

Next, a process performed when a PIN code login is requested is described.

When a PIN code is entered on the login screen 510 (see FIG. 12) displayed on the operations panel 25 of the image forming apparatus 20a and the OK button 511 is pressed, the authentication control unit 221 sends a login request to the service providing system 70 (S801). The login request includes the organization ID, the device ID, and the PIN code.

Next, steps similar to steps S612 through S616 of FIG. 28 are performed (S802 through S806). After step S806, the PIN code management unit 727 sends a print data request including the organization code and the PIN code used for the successful login process to the print service application 711a (S807).

When receiving the print data request, the print information providing unit 87 of the print service application 711a obtains print data corresponding to the organization code and the PIN code specified in the print data request from the print information storage unit 734 (S808). More specifically, the print information providing unit 87 obtains print data corresponding to the organization code and a data identification number of the PIN code. In this exemplary process, it is assumed that the data identification number of the PIN code entered at step S801 is not "00". The print information providing unit 87 sends the obtained print data to the image forming apparatus 20a (S809).

Then, the print control unit 223 of the image forming apparatus 20a controls execution of a print job for the obtained print data (S810). As a result, the print data is printed on a recording medium such as paper, and the recording medium is output from the image forming apparatus 20a.

In the above embodiments, a system including the management server 10, the authentication server 50, and the storage server 60 is an example of an information processing system. Also, the service providing system 70 is an example of an information processing system. Print object data and print data are examples of output data. The above embodiments may also be applied to apparatuses for outputting data other than print data. Each of the email receiving unit 11 and the email obtaining unit 724 is an example of an output data receiving unit. Each of the address confirmation unit 12 and the user name identification unit 83 is an example of an identification unit. A user name is an example of a user identifier. Data identification numbers other than "01" and "02" are examples of individual identifiers. Data identification numbers "01" and "02" are examples of group identifiers. A request identification number is an example of a common identifier. Each of the print information generating unit 14 and the print information generating unit 84 is an example of a storage processing unit. Each of the email transmission unit 16, the email transmission unit 86, and the PIN code management unit 727 is an example of a reporting unit. Each of the print information providing unit 63 and the print information providing unit 87 is an example of a transmission unit. Each of the user information storage unit 52 and the user information storage unit 733 is an example of a user information storage unit. Each of the print information storage unit 62 and the print information storage unit 734 is an example of a data storage unit. Each of a print request email and print object data included in a print request email is an example of email data. The request identification number management table is an example of an identification information storage unit. The PIN code management unit 727 is an example of a first reception unit and a second reception unit. The user authentication unit 721 is an example of a third reception unit.

An aspect of this disclosure provides an information processing system, an information processing method, and an information processing apparatus that make it possible to give a right to output data even to a user who does not have a necessary account.

An information processing system, an information processing method, and an information processing apparatus according to the embodiments of the present invention are described above. However, the present invention is not limited to the specifically disclosed embodiments, and variations and modifications may be made without departing from the scope of the present invention.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD-ROM, magnetic tape device or solid state memory device.)

What is claimed is:

1. An information processing system, comprising:
one or more information processing apparatuses each of which includes a memory that stores a program and a processor that executes the program stored in the memory to perform a process including
receiving request data sent from a user terminal via a network;
acquiring one or more output data items from the request data;
storing the one or more output data items in a data storage;
sending, to a user, response data via the network in response to receiving the request data, the response data including at least a first information item and a plurality of second information items when a plurality of the output data items are acquired from the request data, the first information item being associated with the plurality of the output data items stored in the data storage, and each of the plurality of the second information items being associated with one of the output data items;
receiving information input by the user for outputting one or more of the stored output data items; and
outputting, via the network, one or more of the stored output data items based on the information input by the user, the plurality of the stored output data items associated with the first information item being output in response to receiving the first information item as the information input by the user, one of the plurality of the stored output data items associated with one of the second information items being output in response to receiving the one of the second information items as the information input by the user.

2. The information processing system as claimed in claim 1, wherein
in the receiving, an email is received as the request data; and
in the acquiring, the one or more output data items are acquired from an email body of the email and data attached to the email.

3. The information processing system as claimed in claim 1, wherein
each of the first information item and the second information items includes a common identifier, each of the second information items includes an individual identifier that identifies one of the output data items, and the first information item does not include the individual identifier.

4. The information processing system as claimed in claim 1, wherein the process further includes
storing user information in a user information storage, the user information including a user identifier of the user; and
determining whether the user identifier in the user information storage is specified based on the request data, wherein
when the user identifier is specified, the one or more output data items are stored in the data storage in association with the specified user identifier; and
in the outputting, one or more of the output data items are output in association with the user identifier when the information input by the user is the user identifier.

5. The information processing system as claimed in claim 4, wherein
the user information storage stores the user information including an email address of the user;
in the receiving, an email is received as the request data; and
in the determining, whether the user identifier is specified is determined based on a sender email address of the received email.

6. The information processing system as claimed in claim 5, wherein
address information is stored in an address information storage, the address information including a plurality of destination email addresses each of which is associated with one of a plurality of first identifiers;
the user information is stored in the user information storage in association with one of the plurality of the first identifiers that is associated with one or more users; and
in the determining, the one of the plurality of the first identifiers is identified based on a destination email address of the received email, and whether the user identifier is included in the user information associated with the identified one of the plurality of the first identifiers is determined.

7. The information processing system as claimed in claim 6, wherein
the process further includes receiving a first identifier from another terminal via the network; and
the response data is sent when the received first identifier is stored in the user information storage or when the one of the plurality of first identifiers is identified based on the destination email address of the received email.

8. The information processing system as claimed in claim 7,
wherein the process further includes receiving the first identifier and the user identifier from the another terminal via the network;
wherein when the email is received, whether the user identifier is included in the user information is determined based on the sender email address and the destination email address of the received email; and
wherein when the request data is received from the another terminal via the network, whether the user identifier is included in the user information stored in the user information storage is determined based on the received first identifier and the received user identifier.

9. A method performed by an information processing system including one or more information processing apparatuses, the method comprising:
receiving request data sent from a user terminal via a network;
acquiring one or more output data items from the request data;
storing the one or more output data items in a data storage;
sending, to a user, response data via the network in response to receiving the request data, the response data including at least a first information item and a plurality of second information items when a plurality of the output data items are acquired from the request data, the first information item being associated with the plurality of the output data items stored in the data storage, and each of the plurality of the second information items being associated with one of the output data items;
receiving information input by the user for outputting one or more of the stored output data items; and outputting, via the network, one or more of the stored output data items based on the information input by the user, the plurality of the stored output data items associated with the first information item being output in response to receiving the first information item as the information input by the user, one of the plurality of the stored output data items associated with one of the second information items being output in response to receiving the one of the second information items as the information input by the user.

10. The method as claimed in claim 9, wherein
in the receiving, an email is received as the request data; and
in the acquiring, the one or more output data items are acquired from an email body of the email and data attached to the email.

11. The method as claimed in claim 9, wherein
each of the first information item and the second information items includes a common identifier, each of the second information items includes an individual identifier that identifies one of the output data items, and the first information item does not include the individual identifier.

12. The method as claimed in claim 9, further comprising:
storing user information in a user information storage, the user information including a user identifier of the user; and
determining whether the user identifier in the user information storage is specified based on the request data, wherein
when the user identifier is specified, the one or more output data items are stored in the data storage in association with the specified user identifier; and
in the outputting, one or more of the output data items are output in association with the user identifier when the information input by the user is the user identifier.

13. The method as claimed in claim 12, wherein
the user information storage stores the user information including an email address of the user;
in the receiving, an email is received as the request data; and
in the determining, whether the user identifier is specified is determined based on a sender email address of the received email.

14. The method as claimed in claim 13, wherein
address information is stored in an address information storage, the address information including a plurality of destination email addresses each of which is associated with one of a plurality of first identifiers;
the user information is stored in the user information storage in association with one of the plurality of the first identifiers that is associated with one or more users; and
in the determining, the one of the plurality of the first identifiers is identified based on a destination email address of the received email, and whether the user identifier is included in the user information associated with the identified one of the plurality of the first identifiers is determined.

15. The method as claimed in claim 14, further comprising:
receiving a first identifier from another terminal via the network,
wherein the response data is sent when the received first identifier is stored in the user information storage or when the one of the plurality of the first identifiers is identified based on the destination email address of the received email.

16. The method as claimed in claim 15, further comprising:
receiving the first identifier and the user identifier from the another terminal via the network,
wherein when the email is received, whether the user identifier is included in the user information is determined based on the sender email address and the destination email address of the received email; and
wherein when the request data is received from the another terminal via the network, whether the user identifier is included in the user information stored in the user information storage is determined based on the received first identifier and the received user identifier.

17. An information processing apparatus, comprising:
a memory that stores a program; and
a processor that executes the program stored in the memory to perform a process including
receiving request data sent from a user terminal via a network;
acquiring one or more output data items from the request data;
storing the one or more output data items in a data storage;
sending, to a user, response data via the network in response to receiving the request data, the response data including at least a first information item and a plurality of second information items when a plurality of the output data items are acquired from the request data, the first information item being associated with the plurality of the output data items stored in the data storage, and each of the plurality of the second information items being associated with one of the output data items;
receiving information input by the user for outputting one or more of the stored output data items; and
outputting, via the network, one or more of the stored output data items based on the information input by the user, the plurality of the stored output data items associated with the first information item being output in response to receiving the first information item as the information input by the user, one of the plurality of the stored output data items associated with one of the second information items being output in response to receiving the one of the second information items as the information input by the user.

* * * * *